United States Patent
Kato

(10) Patent No.: US 8,917,976 B2
(45) Date of Patent: Dec. 23, 2014

(54) INFORMATION PROCESSOR, INFORMATION PROCESSING METHOD, AND PROGRAM

(71) Applicant: Sony Corporation, Tokyo (JP)

(72) Inventor: Motoki Kato, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/680,532

(22) Filed: Nov. 19, 2012

(65) Prior Publication Data

US 2013/0136417 A1   May 30, 2013

(30) Foreign Application Priority Data

Nov. 28, 2011   (JP) .................................. 2011-258887

(51) Int. Cl.
*H04N 5/93* (2006.01)
*G11B 27/034* (2006.01)
*G11B 27/10* (2006.01)

(52) U.S. Cl.
CPC ............ *G11B 27/102* (2013.01); *G11B 27/034* (2013.01)
USPC ........................................................ 386/278

(58) Field of Classification Search
CPC ............ H04N 5/76; H04N 7/163; H04N 7/50; G11B 20/10; G11B 20/10527; G11B 20/1217; G11B 20/18; G11B 20/1883; G11B 7/005; G06K 9/3258
See application file for complete search history.

(56) References Cited

U.S. PATENT DOCUMENTS

| 7,738,776 | B2 | 6/2010 | Kato et al. |
| 2002/0135607 | A1* | 9/2002 | Kato et al. .................... 345/716 |
| 2004/0234237 | A1* | 11/2004 | Hamada et al. ................. 386/52 |
| 2005/0025461 | A1 | 2/2005 | Kato et al. |
| 2008/0126427 | A1* | 5/2008 | Kuroiwa et al. ........... 707/104.1 |

FOREIGN PATENT DOCUMENTS

JP   2002-158972 A   5/2002

* cited by examiner

*Primary Examiner* — Tat Chio
(74) *Attorney, Agent, or Firm* — Lerner, David, Littenberg, Krumholz & Mentlik, LLP

(57) ABSTRACT

An information processor includes: a recording portion configured to record a table describing a correspondence relationship between reproduction information in accordance with which reality information as reality of contents is specified to be reproduced and which is adapted to share the same reality information with any other suitable reproduction information, and the reality information to which the reproduction information refers, with respect to all of pieces of reproduction information recorded in a recording medium, in one file; a deleting portion configured to delete the reproduction information instructed; and an updating portion configured to update the table when the reproduction information is deleted.

6 Claims, 30 Drawing Sheets

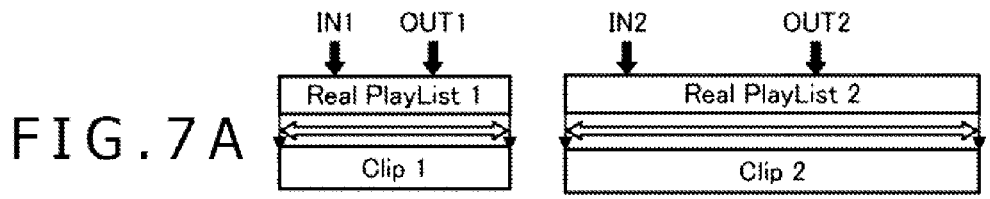
FIG.7A
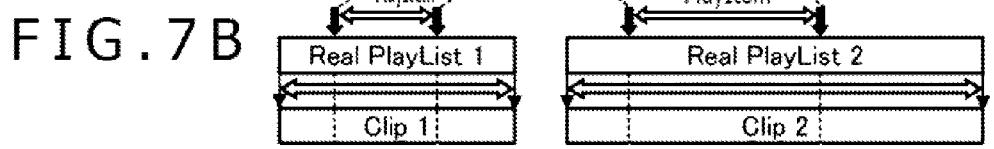
FIG.7B
FIG.8
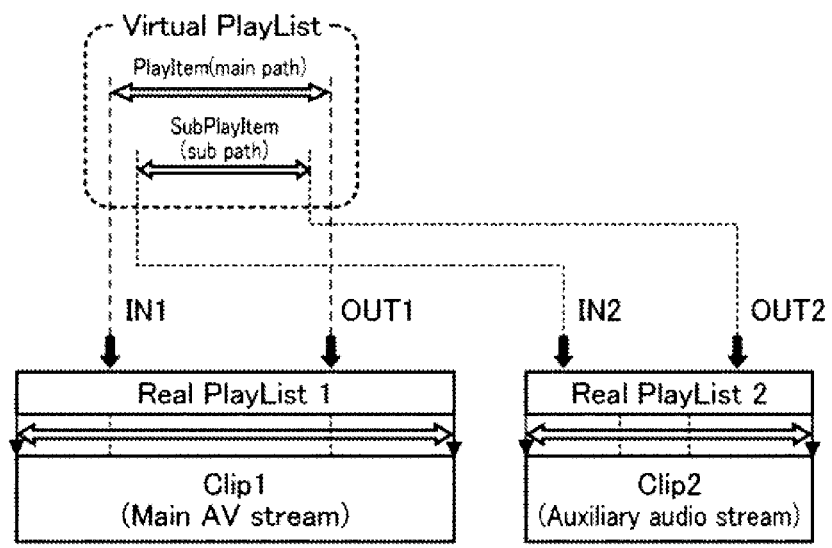

FIG. 17

| Syntax | No. of bits | Mnemonics |
|---|---|---|
| INDEX.BAV(){ | | |
|   type_indicator | 8*4 | bslbf |
|   version_number | 8*4 | bslbf |
|   reserved_for_future_use | 256 | bslbf |
|   length | 32 | uimsbf |
|   number_of_PlayLists | 16 | uimsbf |
|   for(k=0; k<number_of_PlayLists; k++){ | | |
|     PlayList_file_name[k] | 8*5 | bslbf |
|     reserved_for_future_use | 8 | bslbf |
|     index_info_start_address[k] | 32 | uimsbf |
|   } | | |
|   for(i=0; i<X; i++){ | | |
|     padding_word | 16 | bslbf |
|   } | | |
|   for(k=0; k<number_of_PlayLists; k++){ | | |
|     index_info[k](){ | | |
|       ref_to_menu_thumbnail_index[k] | 16 | uimsbf |
|       PlayList_character_set[k] | 8 | uimsbf |
|       reserved_for_future_use | 7 | bslbf |
|       is_played_flag[k] | 1 | bslbf |
|       time_zone[k] | 8 | bslbf |
|       reserved_for_future_use | 7 | bslbf |
|       record_time_and_date[k] | 4*14 | bslbf |
|       PlayList_duration[k] | 4*6 | bslbf |
|       channel_number[k] | 16 | uimsbf |
|       reserved_for_future_use | 8 | bslbf |
|       channel_name_length[k] | 8 | uimsbf |
|       channel_name[k] | 8*20 | bslbf |
|       PlayList_name_length[k] | 8 | uimsbf |
|       PlayList_name[k] | 8*255 | bslbf |
|       length_mpd[k] | 16 | bslbf |
|       if(length_mpd !=0){ | | |
|         mdp[k](){ | | |
|           maker_ID[k] | 16 | uimsbf |
|           maker_model_code[k] | 16 | uimsbf |
|           maker_private_data[k] | (length_mpd-4)*8 | |
|         } | | |
|       } | | |
|     } | | |
|     for(i=0; i<Y; i++){ | | |
|       padding_word | 16 | bslbf |
|     } | | |
|   } | | |
| } | | |

FIG. 18

| Syntax | No. of bits | Mnemonics |
|---|---|---|
| INFO.BAV{ | | |
|   type_indicator | 8*4 | bslbf |
|   version_number | 8*4 | bslbf |
|   TableOfPlayLists_start_address | 32 | uimsbf |
|   ExtensionData_start_address | 32 | uimsbf |
|   reserved_for_future_use | 192 | bslbf |
|   UIAppInfoBDAV() | | |
|   for(i=0; i<N1; i++){ | | |
|     padding_word | 16 | bslbf |
|   } | | |
|   TableOfPlayLists() | | |
|   for(i=0; i<N2; i++){ | | |
|     padding_word | 16 | bslbf |
|   } | | |
|   ExtensionData() | | |
|   for(i=0; i<N3; i++){ | | |
|     padding_word | 16 | bslbf |
|   } | | |
| } | | |

FIG.19

| Syntax | No. of bits | Mnemonics |
|---|---|---|
| ExtensionData(){ | | |
|   length | 32 | uimsbf |
|   if(length !=0){ | | |
|     data_block_start_address | 32 | uimsbf |
|     reserved_for_word_align | 24 | bslbf |
|     number_of_ext_data_entries | 8 | uimsbf |
|     for(i=0; i<number_of_ext_data_entries; i++){ | | |
|       ext_data_entry(){ | | |
|         ID1 | 16 | uimsbf |
|         ID2 | 16 | uimsbf |
|         ext_data_start_address | 32 | uimsbf |
|         ext_data_length | 32 | uimsbf |
|       } | | |
|     } | | |
|     for(i=0; i<L1; i++){ | | |
|       padding_word | 16 | bslbf |
|       padding_word | 16 | bslbf |
|     } | | |
|     data_block() | 32+<br>8*(length -<br>data_block<br>_start_address | |
|   } | | |
| } | | |

FIG.20

```
ExtensionData(){
    length
    data_block_start_address
    number_of_ext_data_entries = 1
    ext_data_entry(){
        ID1 = 0x00F0
        ID2 = 0x0001
        ext_data_start_address
        ext_data_length
    }
    data_block(){
        PL_to_Clips_table()
    }
}
```

FIG.21

| Syntax | No. of bits | Mnemonics |
|---|---|---|
| PL_to_Clips_table(){ | | |
|    length | 32 | uimsbf |
|    number_of_PlayLists | 16 | uimsbf |
|    for(k=0; k<number_of_PlayLists; k++){ | | |
|       PlayList_file_name[k] | 8*5 | bslbf |
|       reserved_for_future_use | 8 | bslbf |
|       Clips_table_start_address[k] | 32 | uimsbf |
|    } | | |
|    for(i=0; i<X; i++){ | | |
|       padding_word | 16 | bslbf |
|    } | | |
|    for(k=0; k<number_of_PlayLists; k++){ | | |
|       clips_table[k](){ | | |
|          number_of_PlayItems[k] | 16 | uimsbf |
|          for(i=0; i<number_of_PlayItems[k]; i++){ | | |
|             Clip_Information_file_name[k][i] | 8*5 | bslbf |
|             reserved_for_future_use | 8 | bslbf |
|          } | | |
|       } | | |
|       for(i=0; i<Y[k]; i++){ | | |
|          padding_word | 16 | bslbf |
|       } | | |
|    } | | |
| } | | |

FIG.22

| Syntax | No. of bits | Mnemonics |
|---|---|---|
| xxxxx.RPL/yyyyy.VPL{ | | |
|     PlayListMark_Start_address | 32 | uimsbf |
|     MakerPrivateData_Start_address | 32 | uimsbf |
|     reserved | 192 | bslbf |
|     PlayList() | | |
|     for(i=0; i<N1; i++){ | | |
|         padding_word | 16 | bslbf |
|     } | | |
|     PlayListMark() | | |
|     for(i=0; i<N2; i++){ | | |
|         padding_word | 16 | bslbf |
|     } | | |
|     MakerPrivateData() | | |
| } | | |

FIG.24

| Syntax | No. of bits | Mnemonics |
|---|---|---|
| PlayList(){ | | |
|    version_number | 8*4 | bslbf |
|    length | 32 | uimsbf |
|    PlayList_type | 8 | uimsbf |
|    CPI_type | 1 | bslbf |
|    reserved | 7 | bslbf |
|    UIAppInfoPlayList() | | |
|    number_of_PlayItems   // main path | 16 | uimsbf |
|    if(<Virtual PlayList>){ | | |
|       number_of_SubPlayItems   // sub path | 16 | uimsbf |
|    }else{ | | |
|       reserved | 16 | bslbf |
|    } | | |
|    for(PlayItem_id=0; | | |
|       PlayItem_id<number_of_PlayItems; | | |
|       PlayItem_id++){ | | |
|       PlayItem()   // main path | | |
|    } | | |
|    if(<Virtual PlayList>){ | | |
|       if(CPI_type==0 && PlayList_type==0){ | | |
|          for(i=0; i<number_of_SubPlayItems; i++){ | | |
|             SubPlayItem()   // sub path | | |
|          } | | |
|       } | | |
|    } | | |
| } | | |

FIG.25

| Syntax | No. of bits | Mnemonics |
|---|---|---|
| UIAppInfoPlayList(){ | | |
| length | 32 | uimsbf |
| reserved_for_future_use | 16 | bslbf |
| PlayList_character_set | 8 | uimsbf |
| reserved_for_word_align | 4 | bslbf |
| playback_protect_flag | 1 | bslbf |
| write_protect_flag | 1 | bslbf |
| is_played_flag | 1 | bslbf |
| is_edited_flag | 1 | bslbf |
| time_zone | 8 | bslbf |
| reserved_for_word_align | 8 | bslbf |
| record_time_and_date | 4*14 | bslbf |
| PlayList_duration | 4*6 | bslbf |
| maker_ID | 16 | uimsbf |
| maker_model_code | 16 | uimsbf |
| channel_number | 16 | uimsbf |
| reserved_for_word_align | 8 | bslbf |
| channel_name_length | 8 | uimsbf |
| channel_name | 8*20 | bslbf |
| PlayList_name_length | 8 | uimsbf |
| PlayList_name | 8*255 | bslbf |
| PlayList_detail_length | 16 | uimsbf |
| PlayList_detail | 8*1200 | bslbf |
| } | | |

FIG.26

| Syntax | No. of bits | Mnemonics |
|---|---|---|
| PlayItem(){ | | |
|     Clip_Information_file_name | 8*10 | bslbf |
|     reserved | 24 | bslbf |
|     STC_sequence_id | 8 | uimsbf |
|     IN_time | 32 | uimsbf |
|     OUT_time | 32 | uimsbf |
|     reserved | 14 | bslbf |
|     connection_condition | 2 | bslbf |
|     if(<Virtual PlayList>){ | | |
|         if(connection_condition=='10'){ | | |
|             BridgeSequenceInfo() | | |
|         } | | |
|     } | | |
| } | | |

FIG.27

| Syntax | No. of bits | Mnemonics |
|---|---|---|
| PlayListMark(){ | | |
|   version_number | 8*4 | bslbf |
|   length | 32 | uimsbf |
|   number_of_PlayList_marks | 16 | uimsbf |
|   for(i=0; i<number_of_PlayList_marks; i++){ | | |
|     reserved | 8 | bslbf |
|     mark_type | 8 | bslbf |
|     mark_time_stamp | 32 | uimsbf |
|     PlayItem_id | 8 | uimsbf |
|     reserved | 24 | bslbf |
|     character_set | 8 | uimsbf |
|     name_length | 8 | uimsbf |
|     mark_name | 8*256 | bslbf |
|     ref_thumbnail_index | 16 | uimsbf |
|   } | | |
| } | | |

FIG.28

| Mark type value | Meaning | Note |
|---|---|---|
| 0x00 | Reserved for future use | |
| 0x01 | IT IS PlayList REPRESENTATIVE IMAGE, AND ITS IMAGE IS SELECTED FROM PICTURE OF VIDEO REFERRED BY PlayList | · mark_time_stamp REPRESENTS Presentation time stamp OF PICTURE IN VIDEO REFERRED BY PlayList.<br>· IF VALUE OF ref_thumbnail_index IS ONE OTHER THAN 0xFFFF, THUMBNAIL IMAGE IS STORED IN MENU.THM OF FIG. 24.<br>· IF VALUE OF ref_thumbnail_index IS 0xFFFF, THUMBNAIL IMAGE IS NOT STORED IN MENU.THM OF FIG. 24. IN THIS CASE, PLAYER MAY DECODE PICTURE SPECIFIED BY Presentation time stamp IN VIDEO REFERRED BY PlayList.<br>· THE NUMBER OF VALUE 0x01 or 0x02 OF MARK TYPE OF PlayListMark() is 0 or 1. |
| 0x02 | IT IS PlayList REPRESENTATIVE IMAGE, AND ITS IMAGE IS NOT SELECTED FROM PICTURE OF VIDEO REFERRED BY PlayList | · VALUE OF ref_thumbnail_index MUST BE ONE OTHER THAN 0xffff. THUMBNAIL IMAGE IS STORED IN MENU.THM OF FIG. 24.<br>· ZERO IS SET IN mark_time_stamp AND PlayItem_id.<br>· THE NUMBER OF VALUE 0x01 or 0x02 OF MARK TYPE OF PlayListMark () is 0 or 1. |
| 0x03 | Resume-mark | · REPRODUCTION RESUME POINT. THE NUMBER OF REPRODUCTION RESUME POINTS DEFINED IN PlayListMark() MUST BE 0 OR 1. |
| 0x04 | Book-mark | · REPRODUCTION ENTRY POINT OF PlayList. THIS MARK CAN BE SET BY USER AND, FOR EXAMPLE, MARK SPECIFYING START POINT OF FAVORITE SCENE IS USED. |
| 0x06 | Skip-start-mark | · SKIP MARK POINT. PLAYER SKIPS PROGRAM FROM THIS POINT UP TO LAST OF PROGRAM. THE NUMBER OF SKIP MARK POINTS DEFINED IN PlayListMark() MUST BE 0 OR 1. |

FIG.29

| Syntax | No. of bits | Mnemonics |
|---|---|---|
| MENU.THM/MARK.THM{ | | |
|   reserved | 256 | bslbf |
|   Thumbnail() | | |
|   for(i=0; i<N1; i++) | | |
|     padding_word | 16 | bslbf |
| } | | |

FIG.30

| Syntax | No. of bits | Mnemonics |
|---|---|---|
| Thumbnail(){ | | |
|   version_number | 8*4 | char |
|   length | 32 | uimsbf |
|   if(length !=0){ | | |
|     th_blocks_start_address | 32 | bslbf |
|     number_of_thumbnails | 16 | uimsbf |
|     tn_block_size | 16 | uimsbf |
|     number_of_tn_blocks | 16 | uimsbf |
|     reserved | 16 | bslbf |
|     for(i=0, i<number_of_thumbnail; i++){ | | |
|       thumbnail_index | 16 | uimsbf |
|       thumbnail_picture_format | 8 | bslbf |
|       reserved | 8 | bslbf |
|       picture_data_size | 32 | uimsbf |
|       start_tn_block_number | 16 | uimsbf |
|       x_picture_length | 16 | uimsbf |
|       y_picture_length | 16 | uimsbf |
|       reserved | 16 | uimsbf |
|     } | | |
|     stuffing_bytes | 8*2*L1 | bslbf |
|     for(k=0; k<number_of_tn_blocks; k++){ | | |
|       tn_block | tn_block_size* 1024*8 | |
|     } | | |
|   } | | |
| } | | |

```
PL_to_Clips_table(){
    number_of_PlayLists = 4

Real PlayList1 {
        Clip1
    }

Real PlayList2 {
        Clip2
    }

Real PlayList3 {
        Clip2
        Clip3
    }

Real PlayList4 {
        Clip3
        Clip4
    }
}
``` ical apparatuses have
come into wide use, and thus it is generally carried out that an
Audio Visual (AV) signal broadcasted is recorded in a disk
and is then reproduced at a timing which a user desires. Since
the AV signal is digitized and thus can be compressed, it is
possible to record the long-time period AV signal in a disk.

INFORMATION PROCESSOR, INFORMATION PROCESSING METHOD, AND PROGRAM

CROSS-REFERENCE TO RELATED APPLICATION

The present application claims priority from Japanese Patent Application No. JP 2011-258887 filed in the Japanese Patent Office on Nov. 28, 2011, the entire content of which is incorporated herein by reference.

BACKGROUND

The present disclosure relates to an information processor, an information processing method, and a program, and more particularly to an information processor which is capable of speedily deleting contents, an information processing method, and a program each corresponding thereto.

In recent years, recording/reproducing apparatuses have come into wide use, and thus it is generally carried out that an Audio Visual (AV) signal broadcasted is recorded in a disk and is then reproduced at a timing which a user desires. Since the AV signal is digitized and thus can be compressed, it is possible to record the long-time period AV signal in a disk.

Now, in addition to disks such as a Blu-ray disk, a Digital Versatile Disk (DVD), and a hard dusk, a semiconductor memory such as a flash memory card is also utilized as a recording medium in which the contents containing therein the AV signal are recorded.

Increasing of a capacity has been progressed and thus a large number of contents has come to be enabled to be recorded in such a recording medium in combination with the digitization of the signals. As a result, although the number of contents able to be recorded in one recording medium, more specifically, the number of PlayLists was about 200 at the most up till now, the number of PlayLists has become as very long as 10,000 or more.

It, for example, is described in Japanese Patent Laid-Open No. 2002-158972 to manage the contents recorded in the recording medium by using both of the PlayList and the Clip. The Clip is data as the reality of the contents, and the PlayList specifies a predetermined period of time of the Clip. For example, when a user instructs the contents to be reproduced, actually, the PlayList is specified. Also, the Clip whose range is referred by the PlayList is reproduced.

SUMMARY

One Clip is referred by two or more PlayLists in some cases. The ranges of one Clip which are referred by two or more PlayLists may be sometimes common, or otherwise may be different from one another. In such a manner, the Clip as the data as the reality of the contents, and the PlayList as the reproduction range of the Clip are managed independently of each other, whereby the contents data, as the reality, having a lot of data amount can be prevented from being redundantly recorded. As a result, the recording capacitance of the recording medium can be efficiently utilized.

As a result, when one PlayList is instructed to be deleted, it may be impossible to immediately delete the Clip corresponding to one PlayList. Thus, only when it is checked whether or not the Clip concerned is referred by other PlayLists, and it is proved that the Clip concerned is not referred by any of other PlayLists, it is possible to delete the Clip concerned.

However, when the number of PlayLists becomes large, in the case where the PlayList recorded in the recording medium is instructed to be deleted, it takes long time to check whether or not the Clip corresponding to the PlayList is referred by any of other PlayLists. As a result, it becomes difficult to speedily delete the PlayList, in a word, the contents.

The present disclosure has been made in order to solve the problems described above, and it is therefore desirable to provide an information processor which is capable of speedily deleting contents, an information processing method, and a program each corresponding thereto.

In order to attain the desire described above, according to an embodiment of the present disclosure, there is provided an information processor. The information processor includes: a recording portion configured to record a table describing a correspondence relationship between reproduction information in accordance with which reality information as reality of contents is specified to be reproduced and which is adapted to share the same reality information with any other suitable reproduction information, and the reality information to which the reproduction information refers, with respect to all of pieces of reproduction information recorded in a recording medium, in one file. The information processor further includes: a deleting portion configured to delete the reproduction information instructed; and an updating portion configured to update the table when the reproduction information is deleted.

The reproduction information can be made a PlayList, and the reality information can be made a Clip.

The recoding portion can further record a file name of the PlayList, a PlayItem representing a reproduction section and contained in the PlayList, and Clip_Information_file_name as a file name of a Clip Information file to which the PlayItem refers.

When the PlayList which is instructed to be deleted is a Real PlayList, and other suitable Real PlayLists refer to the same Clip Information file, the deleting portion can delete the Real PlayList which is instructed to be deleted, and when other suitable Real PlayLists do not refer to the same Clip Information file, the deleting portion can delete the Clip Information file corresponding to the Real PlayList in addition to the Real PlayList which is instructed to be deleted.

When the PlayList which is instructed to be deleted is a Virtual PlayList, the deleting portion can delete the Virtual PlayList.

According to another embodiment of the present disclosure, there is provided an information processing method including: recording a table describing a correspondence relationship between reproduction information in accordance with which reality information as reality of contents is specified to be reproduced and which is adapted to share the same reality information with any other suitable reproduction information, and the reality information to which the reproduction information refers, with respect to all of pieces of reproduction information recorded in a recording medium, in one file; deleting the reproduction information instructed; and updating the table when the reproduction information is deleted.

According to still another embodiment of the present disclosure, there is provided a program in accordance with which a computer is caused to execute: recording a table describing a correspondence relationship between reproduction information in accordance with which reality information as reality of contents is specified and which is adapted to share the same reality information with any other suitable reproduction information, and the reality information to which the reproduction information refers, with respect to all of pieces of reproduction information recorded in a recording medium, in one file; deleting the reproduction information instructed; and updating the table when the reproduction information is deleted.

According to the embodiments of the present disclosure, the table for describing the correspondence relationship between the reproduction information in accordance with which the reality information as the reality of contents is specified to be reproduced and which is adapted to share the same reality information with any other suitable reproduction information, and the reality information to which the reproduction information refers, with respect to all of pieces of reproduction information recorded in the recording medium, is recorded in one file, and the contents of the table are updated when the reproduction information which is instructed to be deleted is deleted.

As set forth hereinabove, according to the present disclosure, it is possible to speedily delete the contents.

BRIEF DESCRIPTION OF THE DRAWINGS

FIGS. 7A and 7B are respectively diagrams explaining assemble editing;

FIG. 8 is a diagram explaining the case where a sub-path is provided in the Virtual PlayList;

FIG. 17 is a table showing a syntax of an INDEX.BAV file;

FIG. 18 is a table showing a syntax of an INFO.BAV file;

FIG. 19 is a table showing a syntax of an ExtensionData( );

FIG. 20 is an image showing an example of the syntax of the ExtensionData( );

FIG. 21 is a table showing a syntax of a PL_to_Clip_table( );

FIG. 22 is a table showing a syntax of xxxxx.RPL and xxxxx.VPL;

FIG. 24 is a table showing a syntax of the PlayList;

FIG. 25 is a table showing a syntax of a UIAppinfoPlayList;

FIG. 26 is a table showing a syntax of a PlayItem;

FIG. 27 is a table showing a syntax of a PlayListMark;

FIG. 28 is a diagram showing a table of mark_type;

FIG. 29 is a table showing a syntax of MENU.THM/MARK.THM;

FIG. 30 is a table showing a syntax of a Thumbnail;

DETAILED DESCRIPTION OF THE PREFERRED EMBODIMENTS

Hereinafter, embodiments of the present disclosure will be described in detail with reference to the accompanying drawings. It is noted that the description will be given below in accordance with the following order.

1. Configuration of Recording/Reproducing Apparatus
2. Editing of AV stream
3. Functional Configuration of Control Section
4. Description of Manipulations
5. PlayList
6. Editing of Real PlayLists
7. Manipulation for Virtual Playlist
8. Re-editing of Virtual Playlist
9. Marks
10. Thumbnails
11. CPI
12. Directories and Files
13. INDEX.BAV File
14. INFO.BAV
15. ExtensionData( )
16. PL_to_Clips_table( )
17. Real PlayList file and Virtual PlayList file
18. Syntax of PlayList
19. UIAppInfoPlayList
20. Syntax of PlayItem
21. PlayListMark( )
22. MENU.THM
23. AV Stream File
24. Recording Processing
25. Deleting Processing
26. Examples of Deletion
27. Application of the Present Disclosure to Program
28. Others

[Configuration of Recording/Reproducing Apparatus]

Figure 1:
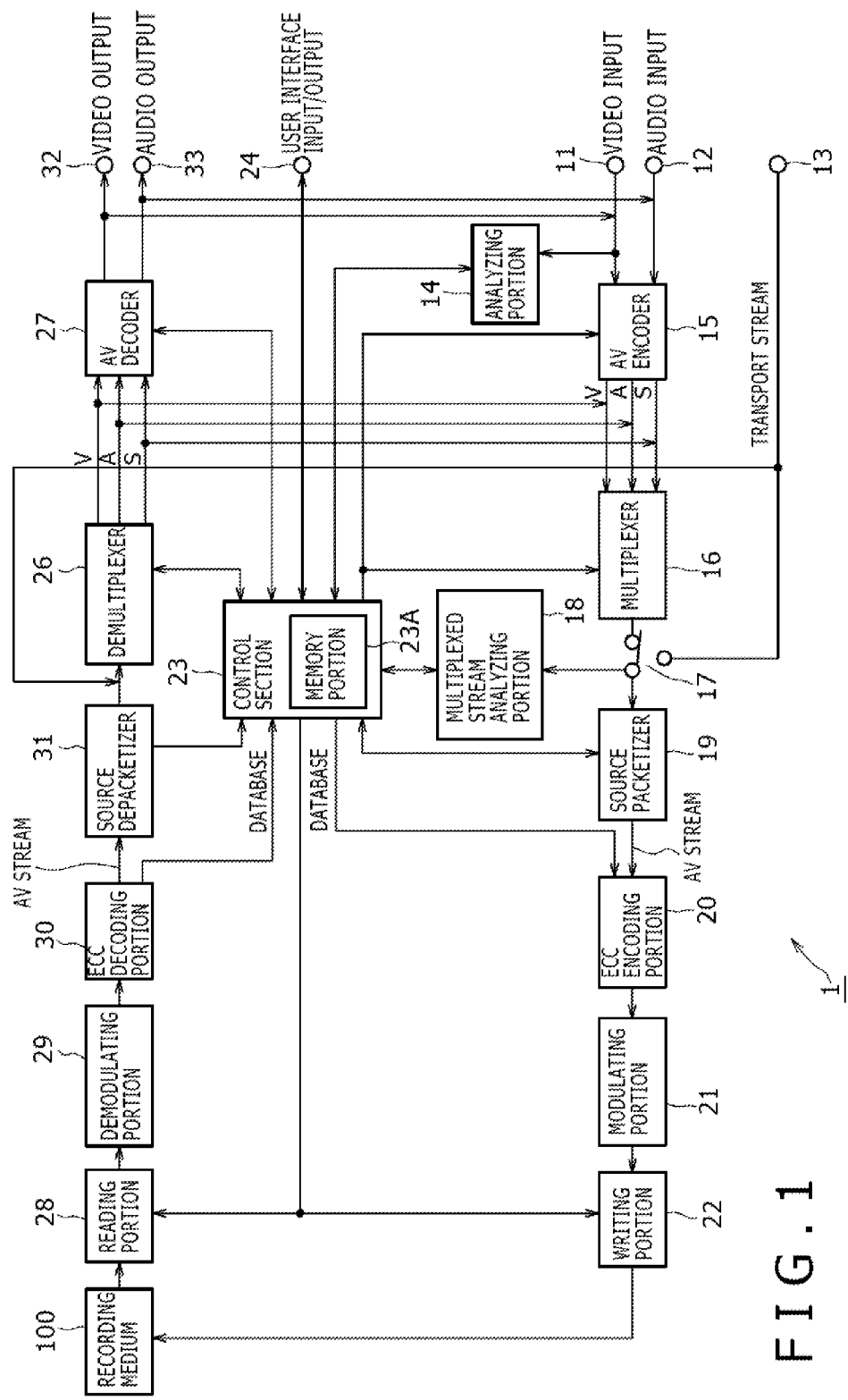
FIG. 1 is a block diagram showing a configuration of a recording/reproducing apparatus as an information processor according to a first embodiment of the present disclosure.

Hereinafter, a first embodiment of the present disclosure will be described in detail with reference to the accompanying drawings. FIG. 1 is a block diagram showing an internal configuration of a recording/reproducing apparatus as an information processor according to the first embodiment of the present disclosure. Firstly, a configuration of a portion for carrying out an operation for recording a signal inputted thereto from the outside in a recording medium will be described below. The recording/reproducing apparatus 1 as the information processor for carrying out at least one of either recording or reproduction of information can receive as an input thereof either analog data or digital data, and can record either the analog data or digital data thus recorded.

An analog video signal and an analog audio signal are inputted to a terminal 11 and a terminal 12, respectively. The analog video signal which has been inputted to the terminal 11 is outputted to each of an analyzing portion 14 and an AV encoder 15. The analog audio signal which has been inputted to the terminal 12 is outputted to the AV encoder 15. The analyzing portion 14 extracts feature points such as a scene change from the analog video signal thus inputted.

The AV encoder 15 encodes the analog video signal and analog audio signal inputted thereto, and outputs an encoded video stream (V), an encoded audio stream (A), and system information (S) such as information on AV synchronization to a multiplexer 16.

The encoded video stream, for example, is a video stream which is obtained through the encoding utilizing a Moving Picture Expert Group (MPEG) 2 system. Also, the encoded audio stream, for example, is an audio stream which is obtained through the encoding utilizing an MPEG1 system, an audio stream which is obtained through the encoding utilizing a Dolby AC3 system, or the like. The multiplexer 16 multiplexes the video and audio streams inputted thereto based on input system information, and outputs the resulting multiplexed stream to each of a multiplexed stream analyzing portion 18 and a source packetizer 19.

The multiplexed stream, for example, is either an MPEG2 transport stream or an MPEG2 program stream. The source packetizer 19 encodes the multiplexed stream thus inputted thereto into an AV stream composed of a source packet in accordance with an application format of a recording medium 100 in which the AV stream is recorded. The resulting AV stream is subjected to predetermined pieces of processing in an error-correction coding (ECC) portion 20 and a modulating portion 21 and is then outputted to a writing portion 22. The writing portion 22 writes (in a word, records) an AV stream file to(in) the recording medium 100 in accordance with a control signal outputted thereto from a control section 23. It is noted that the recording medium 100 can be composed of a semiconductor memory such as a flash memory card in addition to a disk such as a Blu-ray disk or a Digital Versatile Disk (DVD) or a hard disk.

A transport stream such as a digital television broadcasting inputted through either a digital interface or a digital television tuner is inputted to a terminal 13. A system for recording the transport stream inputted to the terminal 13 includes two systems: a system for recording a transport stream in a transparent; and a system for recording a transport stream after being re-encoded for the purpose of, for example, reducing a recording bit rate. Information on an instruction for a recording system is inputted from a terminal 24 to which a user interface (not shown) is connected to the control section 23.

When the input transport stream is recorded in the transparent, the transport stream which has been inputted to the terminal 13 is outputted to each of the multiplexed stream analyzing portion 18 and the source packetizer 19. Since the subsequent processing until the AV stream is recorded in the recording medium 100 is the same as that when the input audio signal and video signal described above are encoded and the resulting encoded signals are then recorded, a description thereof is omitted here for the sake of simplicity.

When the input transparent stream is recorded after having been re-encoded, the transparent stream which has been inputted to the terminal 13 is inputted to a demultiplexer 26. The demultiplexer 26 executes demultiplexing processing for the transparent stream inputted thereto, and extracts a video stream (V), an audio stream (A), and system information (S).

Of the streams (V), (A), and (S) (that is, the information) extracted from the demultiplexer 26, the video stream (V), and each of the audio stream (A) and the system information (S) are outputted to an AV decoder 27 and the multiplexer 16, respectively. The AV decoder 27 decodes the video stream inputted thereto, and outputs a reproduced video signal to the AV encoder 15. The AV encoder 15 encodes the input video signal, and outputs the resulting encoded video stream (V) to the multiplexer 16.

On the other hand, both of the audio stream (A) and the system information (S) which have been outputted from the demultiplexer 26 to be inputted to the multiplexer 16, and the video stream (V) which has been outputted from the AV encoder 15 are multiplexed based on the input system information, and the resulting stream is then outputted as the multiplexed stream to each of the multiplexed stream analyzing portion 18 and the source packetizer 19 through the switch 17. Since the subsequent processing until the AV stream is recorded in the recording medium 100 is the same as that when the input audio signal and video signal described above are encoded and the resulting encoded signals are then recorded, a description thereof is omitted here for the sake of simplicity.

The recording/reproducing apparatus 1 of the first embodiment records a file of the AV stream in the recording medium 100, and records application database information as well describing the file in the recording medium 100. The application database information is created by the control section 23. The input information to the control section 23 includes feature information, on a moving image, from an analyzing portion 14, feature information, on the AV stream, from the multiplexed stream analyzing portion 18, and instruction information supplied, from the user and inputted through the terminal 24.

The feature information, on the moving image, supplied from the analyzing portion 14 is information on a characteristic image in an input moving signal. For example, the feature information, on the moving image, supplied from the analyzing portion 14 is includes specification information (for example, marks) on a start point, a scene change point, a start/end point of a commercial message (CM), and the like of a program. Also, information on a thumbnail image of a specification place thereof is also included in the feature information, on the moving image, supplied from the analyzing portion 14.

The feature information, on the AV stream, supplied from the multiplexed stream analyzing portion 18 is information on the encoding information of the AV stream to be recorded. For example, the feature information, on the AV stream, supplied from the multiplexed stream analyzing portion 18 includes address information on an I picture within the AV stream, encoding parameters of the AV stream, change point information on the encoding parameters within the AV stream, information (for example, marks) on the characteristic image within the video stream, and the like.

The instruction information, issued from the user, through the terminal 24 includes specification information on a reproduction section specified by the user, characters describing the contents of the reproduction section, information on a book mark and a resume point with which the user sets a favorite scene, and the like.

The control section 23, for example, composed of a microprocessor unit includes a memory portion 23A for storing therein predetermined information. The control section 23 creates a database (Clip) of the AV stream, a database obtained through grouping of the reproduction section (PlayItem) of the AV stream, management information (INFO.BAV) on contents recorded in the recording medium 100, and information on a thumbnail image based on the input information described above. Application database information composed of these pieces of information is processed in both of the ECC encoding portion 20 and the modulating portion 21 similarly to the case of the AV stream to be inputted to the writing portion 22. The writing portion 22 records a database file in the recording medium 100 in accordance with a control signal outputted thereto from the control section 23.

Details of the application database information described above will be described later.

When the AV stream file (that is, the file of the video data and the audio data) and the application database information which are both recorded in the recording medium 100 in such a manner are reproduced, the AV stream file and the application database information are processed in the following manner. Firstly, the control section 23 instructs the reading portion 28 to read out the application database information from the recording medium 100. Also, the reading portion 28 reads out the application database information from the recording medium 100. The application database information thus read out is inputted to the control section 23 through the predetermined pieces of processing in the demodulating portion 29 and the ECC decoding portion 30.

The control section 23 outputs a list of PlayLists (in a word, a list of contents) recorded in the recording medium 100 to a terminal 24 to which user interface input/output is connected based on the application database information. Of course, the list of the PlayLists can also be outputted as a video output from a terminal 32 to a display device (not shown). When the user selects the PlayList (in a word, the contents) which he/she desires to reproduce from the list of the PlayLists, information on the PlayLists for which the reproduction is specified is inputted from the user interface input/output to the control section 23. The control section 23 instructs the reading portion 28 to read out the AV stream file necessary for the reproduction of the PlayList concerned. The reading portion 28 reads out the corresponding AV stream from the recording medium 100, and outputs the corresponding AV stream thus read out to the demodulating portion 29 in accordance with the instruction issued from the control section 23. The AV stream inputted to the demodulating portion 29 is subjected to predetermined processing to be demodulated and is then outputted to a source depacketizer 31 through processing executed in the ECC decoding portion 30.

The list of the PlayLists is also displayed on the display device (not shown) even when the user instructs the deletion of the PlayList(s). The user specifies the PlayList(s) which is(are) concretely desired to be deleted from the list displayed on the display device.

The source depacketizer 31 converts the AV stream which has the application format, and which has been read out from the recording medium 100 to be subjected to the predetermined processing into a stream which can be outputted to the demultiplexer 26. The demultiplexer 26 outputs the video stream (V), the audio stream (A), and the system information (S) such as the information on the AV synchronization composing the reproduction section (that is, the PlayItem) of the AV stream specified by the control section 23 to the AV decoder 27. Also, the AV decoder 27 decodes both of the video streams and the audio stream, and outputs the reproduced video signal and the reproduced audio signal from the corresponding terminals 32 and 33, respectively.

In addition, when information used to instruct random access reproduction or special reproduction is inputted through a terminal 24 as the user interface, the control section 23 determines a position where the AV stream is to be read out from the reading medium 100, and instructs the recording portion 28 to read out the AV stream based on the contents of the database (Clip) in the AV stream. For example, when the PlayList which has been selected by the user is reproduced from predetermined time on, the control section 23 instructs the reading portion 28 to read out data from the I picture having a time stamp closest to the specified time.

In addition, when the Fast-forward playback is instructed by the user, the control section 23 instructs the reading portion 28 to successively, continuously read out the I-picture data in the AV stream based on the database (Clip) of the AV stream.

The reading portion 28 reads out the data on the AV stream from a random access point specified. The data thus read out is reproduced through processing in subsequent portions.

[Editing of AV Stream]

Next, a description will be given with respect to the case where the user edits the AV stream recorded in the recording medium 100. When the user desires to specify the reproduction section of the AV stream recorded in the recording medium 100 to create a new reproduction path, for example, when the user desires to create a reproduction path such that a portion of a singer, a, is desired to be reproduced from a music program as a program A and subsequently, a portion of the singer, a, is desired to be reproduced from a music program as a program B, information on a start point (in point) and an end point (out point) of the reproduction section is inputted to the control section 23 through the terminal 24 as the user interface. The control section 23 creates a database obtained through the grouping (PlayList) of the reproduction section (PlayItem) of the AV stream.

When the user desires to delete a part of the AV stream recorded in the recording medium 100, the information on an in point and an out point of a deletion section is inputted to the control section 23 through the terminal 24 as the user interface. The control section 23 changes the contents of the database of the PlayLists so as to refer to only the necessary AV stream portion. In addition, the control section 23 instructs the writing portion 22 to delete an unnecessary stream portion of the AV stream.

A description will now be given with respect to the case where the user desires to specify the reproduction sections of the AV stream recorded in the recording medium 100 to create a new reproduction path, and also desires to connect the reproduction sections to one another in a seamless manner. In such a case, the control section 23 creates a database obtained through grouping (PlayList) of the reproduction sections (PlayItems) of the AV stream and also carries out both of partial re-encoding of the video stream in the vicinity of the connection point(s) between the reproduction sections, and the remultiplexing.

Firstly, both of information on a picture of the in point of the reproduction section, and information on a picture of the out point of the reproduction section are inputted to the control section 23 through the terminal 24. The control section 23 instructs the reading portion 28 to read out data necessary for reproducing both of an in point side picture and an out point side picture. Also, the reading portion 28 reads out the data from the recording medium 100. The data thus read out is then outputted to the demultiplexer 26 through the demodulator 29, the ECC decoding portion 30, and the source depacketizer 31.

The control section 23 analyzes the data inputted to the demultiplexer 26, determines a method of re-encoding the video stream (change of picture_coding_type, and allocation of an amount of encoded bits to be re-encoded), and a remultiplexing system, and supplies information on the system thus determined to each of the AV encoder 15 and the multiplexer 16.

Next, the demultiplexer 26 separates the stream inputted thereto into the video stream (V), the audio stream (A), and the system information (S). The video stream (V) includes "data to be inputted to the AV decoder 27," and "data to be inputted to the multiplexer 16." The former data is data necessary for carrying out the re-encoding, and is decoded in the AV decoder 27. Thus, the picture decoded is re-encoded in the AV encoder 15 to be made the video stream. On the other hand, the latter data is data which is copied from the original stream without being re-encoded. Both of the audio stream and the system information are directly inputted to the multiplexer 16.

The multiplexer 16 multiplexes the input streams based on the information inputted thereto from the control section 23, and outputs the resulting multiplexed stream. The multiplexed stream is processed in both of the ECC coding portion 20 and the modulating portion 21, and is then inputted to the writing portion 22. The writing portion 22 records the AV stream in the recording medium 100 in accordance with the control signal supplied thereto from the control section 23.

[Functional Configuration of Control Section]

Figure 2:
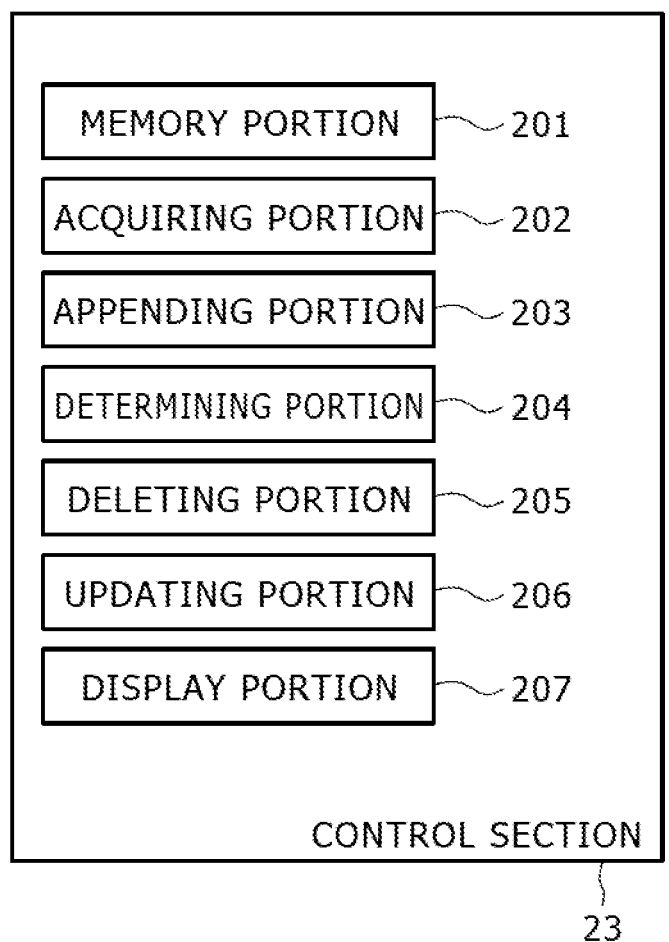
FIG. 2 is a block diagram showing a functional configuration of a control section of the recording/reproducing apparatus as the information processor of the first embodiment.

FIG. 2 is a block diagram showing a functional configuration of the control section 23. In the first embodiment, the control section 23 includes a recording portion 201, an acquiring portion 202, an appending portion 203, a determining portion 204, a deleting portion 205, an updating portion 206, and a display portion 207. These portions 201 to 207, for example, either can be configured in the form of hardware, or can be configured in the form of software.

The recording portion 201 records therein various kinds of pieces of information. The acquiring portion 202 acquires various kinds of pieces of information. The appending portion 203 appends predetermined information. The determining portion 204 executes determination processing. The deleting portion 205 deletes predetermined information. The updating portion 206 updates predetermined information. Also, the display portion 207 displays information thereon.

[Description of Manipulations]

Figure 3:
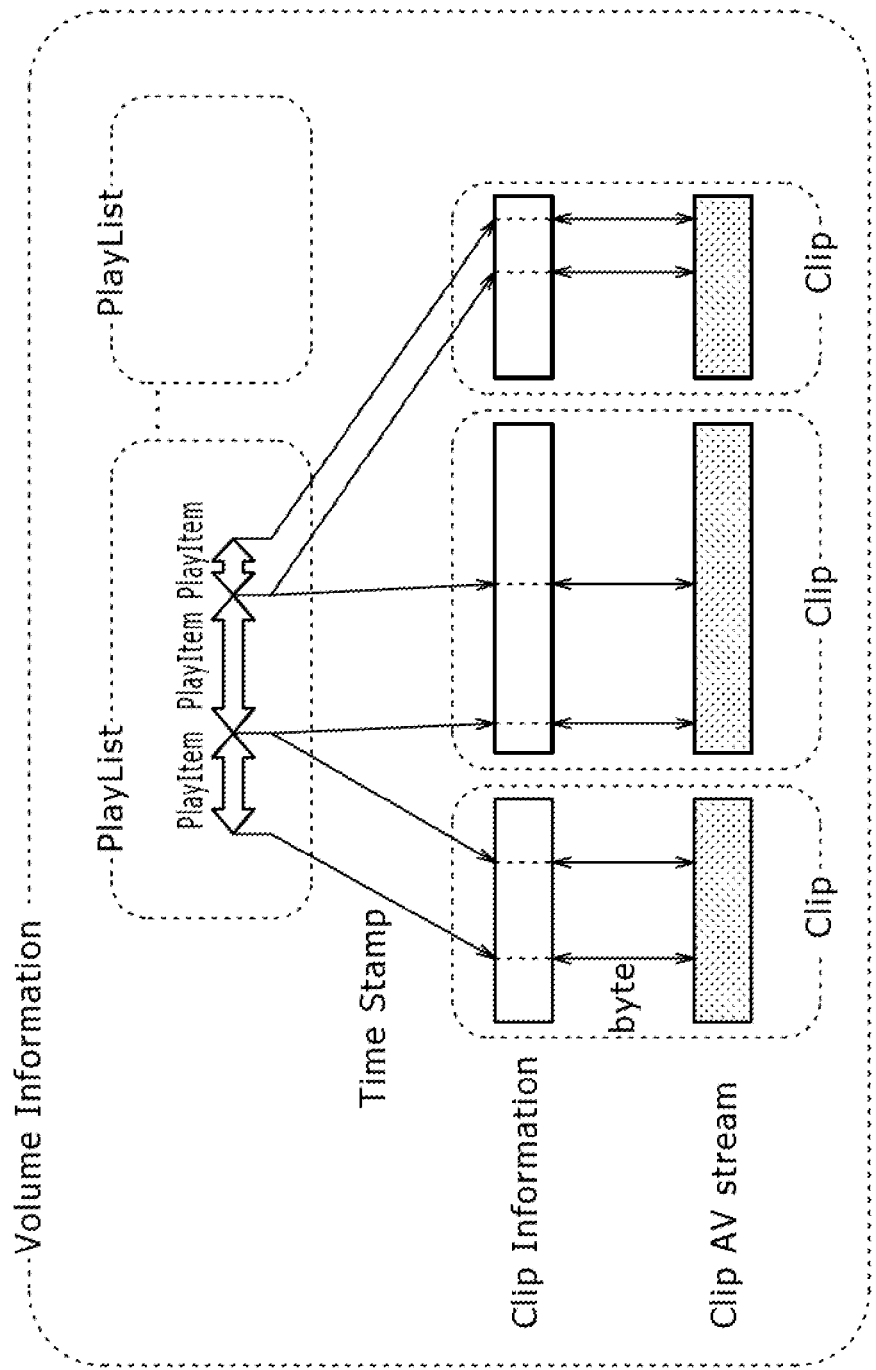
FIG. 3 is a diagram explaining a format of data recorded in a recording medium by the recording/reproducing apparatus shown in FIG. 1.

Hereinafter, a description will be given with respect to manipulations for application database information such as reproduction and editing based on the application database information. FIG. 3 is a block diagram explaining a structure of an application format. The application format has two layers of the PlayList and the Clip for management of the AV stream. Volume Information is used for managing all of the Clips and PlayLists within the disk. In this case, a pair of one AV stream and accompanying information thereof is thought to be one object which is in turn referred to as "the Clip." The AV stream file is referred to as "a Clip AV stream file" and accompanying information thereof is referred to as "Clip Information file." In a word, the Clip is reality information as the reality of the contents, and the PlayList is reproduction information specifying reproduction of the reality information thereof.

Data in which the MPEG2 transport stream is disposed in a structure regulated by the application format is stored in one Clip AV stream file. In general, although the file is treated as a byte row, the contents of the Clip AV stream file are developed on a time axis, and an entry point in the Clip is mainly specified on a time-based basis. When a time stamp of an access point to a predetermined Clip is given, the Clip Information file is useful in finding out address information with which the reading of the data is to be started in the Clip AV stream file.

[PlayList]

Figure 4:
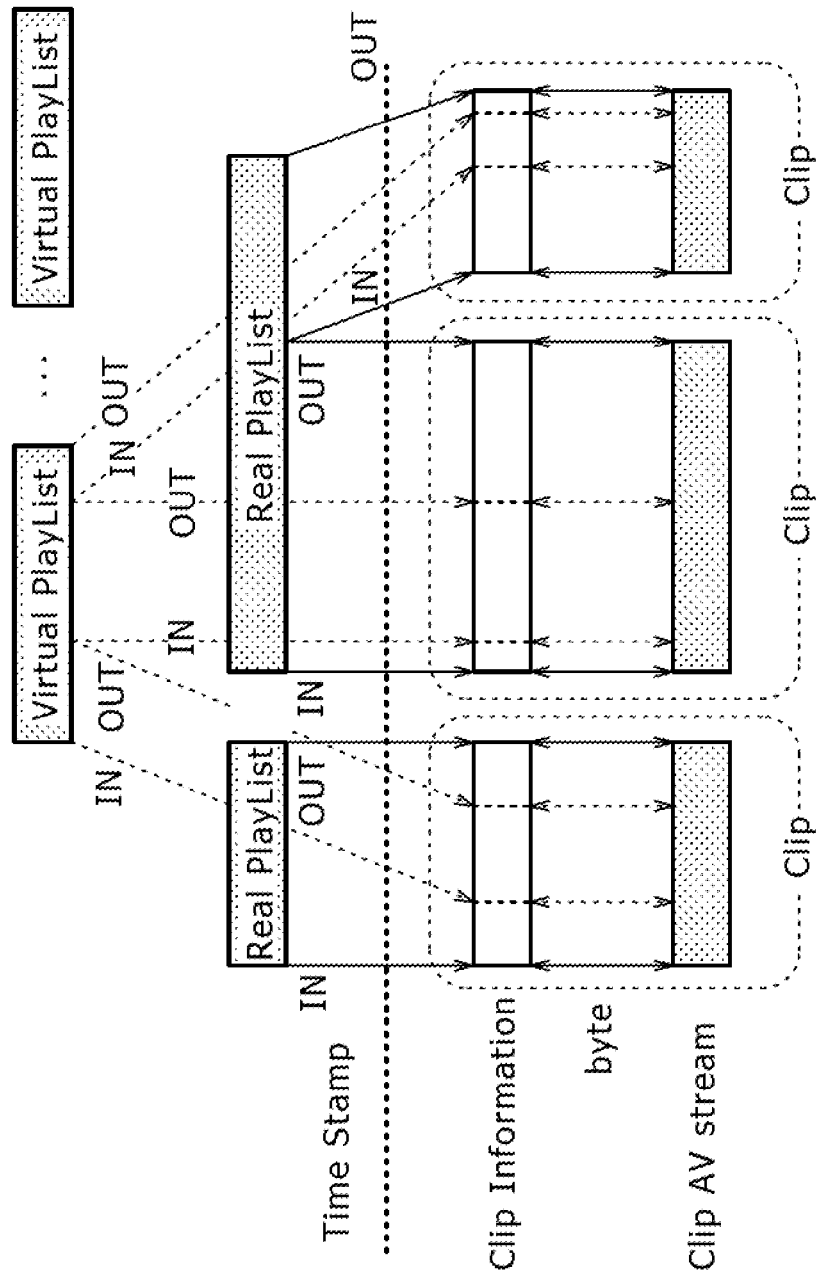
FIG. 4 is a diagram explaining both of a Real PlayList and a Virtual PlayList.

The PlayList will be described below with reference to FIG. 4. The PlayList is provided in order that the user may select the reproduction section(s) which he/she desires to view from the Clips and the reproduction section(s) may be enabled to be simply edited. One PlayList is an assembly of the reproduction sections in the Clips. One reproduction section in the predetermined Clip is called a PlayItem which is in turn expressed by a pair of in point (IN) and out point (OUT) on the time axis. Therefore, plural PlayItems are assembled, thereby composing the PlayList.

The PlayList has two types. One type is a Real PlayList, and the other is a Virtual PlayList. The Real PlayLists share a stream portion of the Clip to which the Real PlayLists concerned refer with one another. That is to say, the Real PlayLists occupy a data capacitance corresponding to the stream portion of the Clip to which the Real PlayLists concerned refer in the disk. Thus, when the Real PlayLists are deleted, the data of the stream portion of the Clip to which the Real PlayLists concerned refer is also deleted.

The Virtual PlayLists do not share the data of the Clip with one another. Therefore, even when the Virtual PlayLists are either changed or deleted, no change is generated in the contents of the Clip at all.

[Editing of Real PlayLists]

Figure 5A:
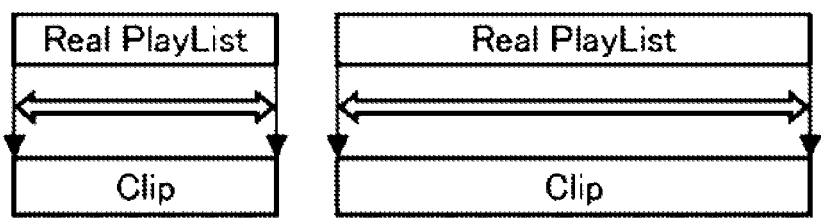
FIGS. 5A to 5C are respectively diagrams explaining creation, division, and combination of Real PlayLists.

Next, the editing of the Real PlayLists will now be desired. FIG. 5A is a diagram with respect to creation of the Real PlayLists. Thus, FIG. 5A shows a manipulation with which when the AV stream is recorded as a new Clip, the Real PlayList which refers to the entire Clip concerned is newly created.

Figure 5B:
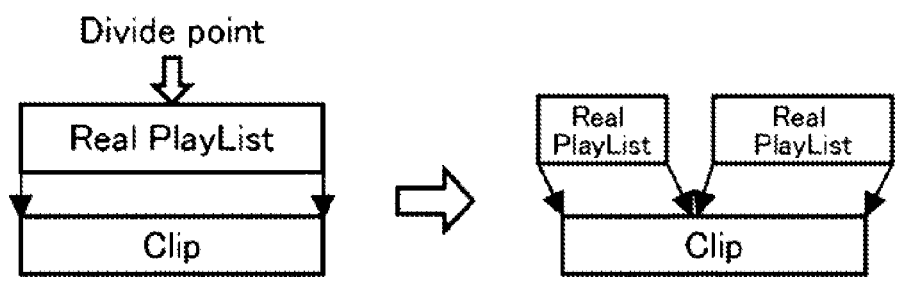

FIG. 5B is a diagram with respect to division of the Real PlayList, and showing a manipulation with which the Real PlayList is divided at a desired point into two Real PlayLists. The division manipulation, for example, is carried out when in such a case that two programs are managed within one Clip managed by one PlayList, the user desires to re-register (record) the two programs as one program. The contents of the Clips are not changed (the Clip itself is not divided) at all by carrying out this manipulation.

Figure 5C:
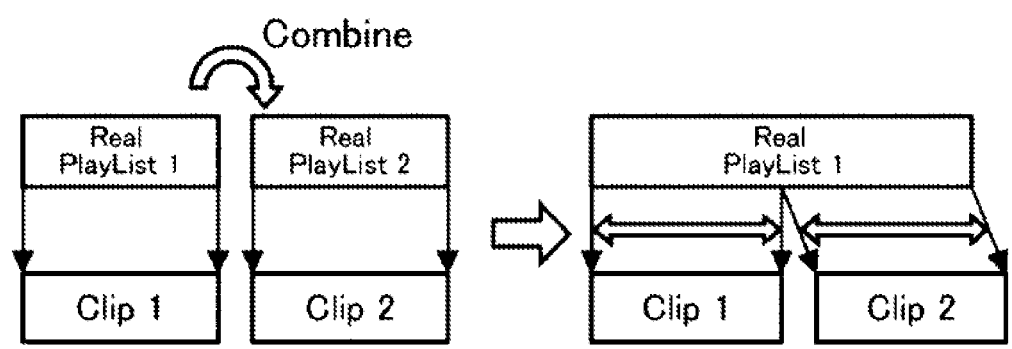

FIG. 5C is a diagram with respect to a combination of the Real PlayLists, and showing a manipulation with which two Real PlayLists are combined with each other into one new Real PlayList. This combination manipulation, for example, is carried out when the user desires to re-register two programs as one program. The Clips are not changed (the Clips themselves are not set as one Clip) at all by carrying out this manipulation.

Figure 6A:
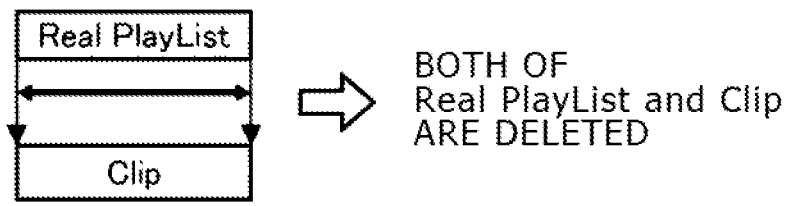
FIGS. 6A to 6C are respectively diagrams explaining deletion, partial deletion, and minimization of the Real PlayList.

FIG. 6A is a diagram with respect to deletion of the entire Real PlayList. In this case, when the manipulation for deleting the entire predetermined Real PlayList is carried out, the corresponding stream portion of the Clip which the deleted Real PlayList refers is also deleted.

Figure 6B:
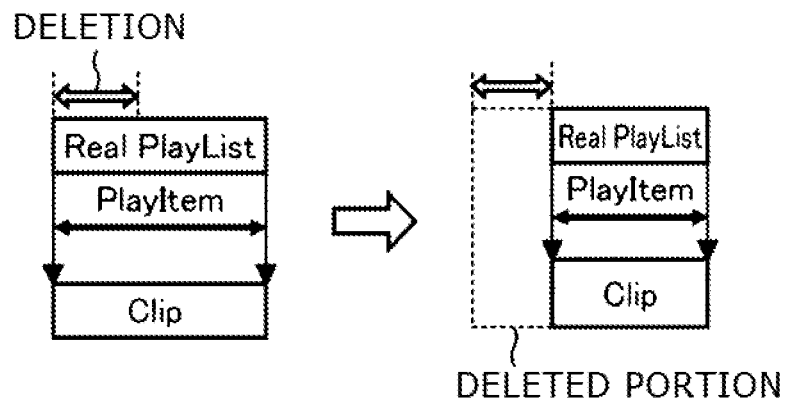

FIG. 6B is a diagram with respect to partial deletion of the Real PlayList. In this case, when a desired portion of the Real PlayList is deleted, the corresponding PlayItem is changed so as to refer to only the stream portion of the necessary Clip. Also, the corresponding stream portion of the Clip is deleted.

Figure 6C:
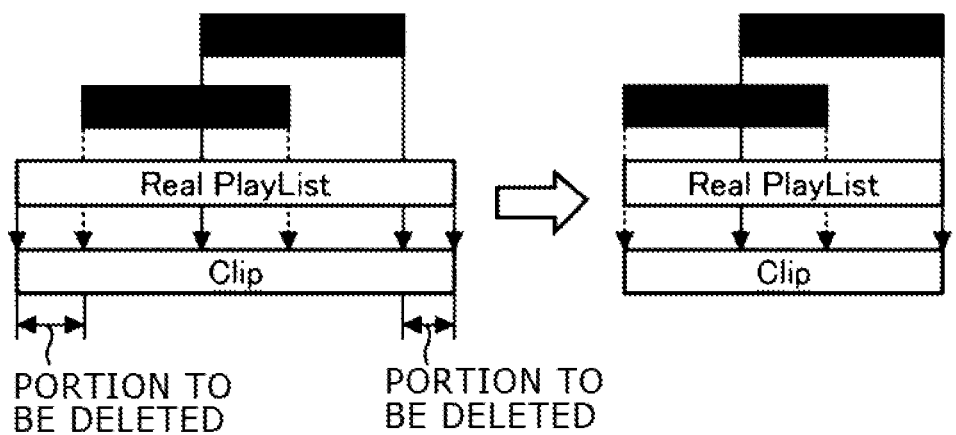

FIG. 6C is a diagram with respect to minimization of the Real PlayList, and showing a manipulation with which the PlayItem corresponding to the Real PlayList is caused to refer to only the stream portion of the Clip necessary for the Virtual PlayList. Thus, the corresponding stream portion of the Clip unnecessary for the Virtual PlayList is deleted.

When by carrying out the manipulation described above, the Real PlayList is changed to delete the stream portion of the Clip to which the Real PlayList concerned refers, it is possible that the Virtual PlayList using the deleted Clip exists, and a problem is caused in the Virtual PlayList concerned due to the deleted Clip.

For the purpose of preventing such a situation from being caused, in response to the deleting manipulation, such a message that "although the Virtual PlayList referring to the stream portion of the Clip to which the Real PlayList concerned refers exists and thus if the Real PlayList concerned is deleted, the Virtual PlayList concerned is also deleted, you can accept this situation?," is displayed to the user, and the user is urged to carry out the confirmation (warning). After that, the deletion processing is either carried out or canceled in accordance with the instruction issued from the user. Alternatively, instead of deleting the Virtual PlayList, the minimization is carried out for the Real PlayList.

[Manipulation for Virtual PlayList]

Next, a manipulation for the Virtual PlayList will be described below. Even when the manipulation is carried out for the Virtual PlayList, the contents of the Clip are not changed at all. FIGS. 7A and 7B are respectively diagrams with respect to Assemble editing (IN-OUT editing), and explaining a manipulation with which a PlayItem of a reproduction section which the user desires to view is made, and a Virtual PlayList is created. In this case, the seamless connection between the PlayItems is supported by an application format.

As shown in FIG. 7A, in the case where two Real PlayLists 1 and 2, and Clips 1 and 2 corresponding to the two Real PlayLists 1 and 2, respectively, exist, when the user instructs a predetermined section within the Real PlayList 1 (PlayItem 1: a section from In 1 to Out 1) as the reproduction section, and also instructs a predetermined section within the Real PlayList 2 (PlayItem 2: a section from In 2 to Out 2) as the reproduction section to be subsequently reproduced, as shown in FIG. 7B, one Virtual Playlist composed of the PlayItem 1 and the PlayItem 2 is created.

[Re-Editing of Virtual PlayList]

Next, Re-editing of a Virtual PlayList will be described below. The Re-editing includes change of an in point and an out point in a Virtual PlayList, insertion and appendent of a new PlayItem into and to a Virtual PlayList, deletion of a PlayItem within the Virtual PlayList, and the like. In addition, the Virtual PlayList itself can also be deleted.

FIG. 8 is a diagram explaining Audio dubbing (post recording) in a Virtual PlayList, and explaining a manipulation for registering the Audio dubbing in the Virtual PlayList as a sub-path. The Audio dubbing is supported by the application format. An additional audio stream is added as a sub-path to an AV stream of a main path of the Virtual PlayList.

Figure 9:
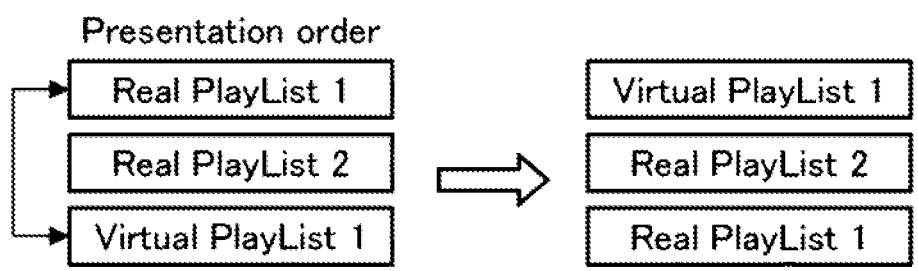
FIG. 9 is a diagram explaining Moving of reproduction order of the PlayList.
Figure 10:
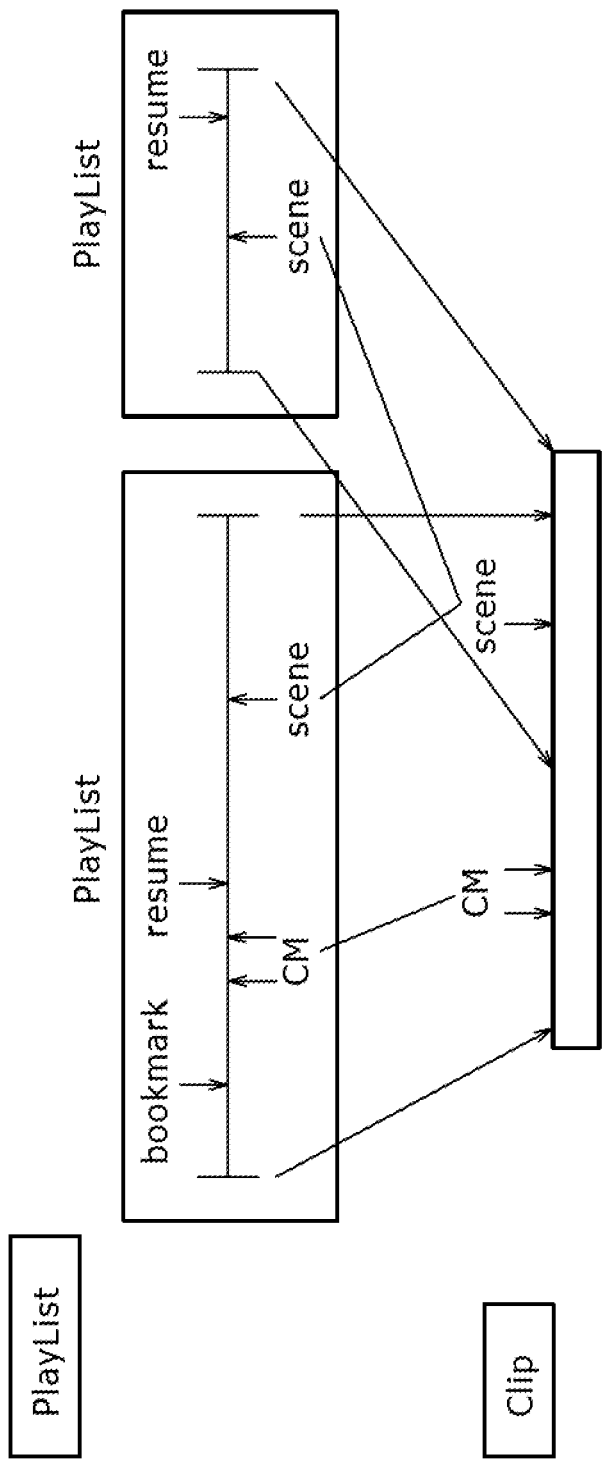
FIG. 10 is a diagram explaining a mark on the PlayList, and a mark on a Clip.

Moving of the order of the reproduction of the PlayList as shown in FIG. 9 is present as a manipulation common to the Real PlayList and the Virtual PlayList. This manipulation is the Moving of the order of the reproduction of the PlayList within the disk (volume), and is supported by Table Of PlayList defined in the application format. The contents of the Clip are not changed at all by carrying out this manipulation.

[Marks]

Next, Marks will be described below. Marks are provided in order to specify a highlight and characteristic time within a Clip and a PlayList. The mark added to the Clip, for example, is a scene change point specifying a characteristic scene due to the contents of the AV stream. When the PlayList is reproduced, the mark to which the PlayList concerned refers can be referred to be used.

The mark added to the PlayList, for example, is either a book mark or a resume point which is mainly set by the user. Setting the mark in either the Clip or the PlayList is carried out by appending a time stamp representing time of the mark to a mark list. In addition, deleting the mark is to remove the time stamp of the mark concerned from the mark list. Therefore, the AV stream is not changed at all by the setting or deletion of the mark.

[Thumbnails]

Next, thumbnails will be described below. The thumbnails are still images which are added to a Volume, a PlayList, and a Clip, respectively. The thumbnails include two kinds. One kind of thumbnail is a thumbnail as a representative image representing the contents. One kind of thumbnail is mainly used in a menu picture in which the user selects desired contents by manipulating a cursor (not shown) or the like. The other is an image representing a scene to which a mark points.

It is necessary for the Volume and the PlayLists to be enabled to have representative images, respectively. For the representative image of the Volume, it, for example, is supposed that when a disk (the recording medium 100 which is hereinafter suitably described as a disk on the assumption that the recording medium 100 has a disk-like shape) is set in a predetermined place of the recording/reproducing apparatus 1, a still image representing the contents of the disk concerned is displayed in the first place, and so forth. For the representative image of the PlayList, it is supposed that in a menu picture (a picture of a list of contents) in which the PlayList is selected, the representative image of the PlayList is used as a still image for representing the contents of the PlayList.

Figure 11:
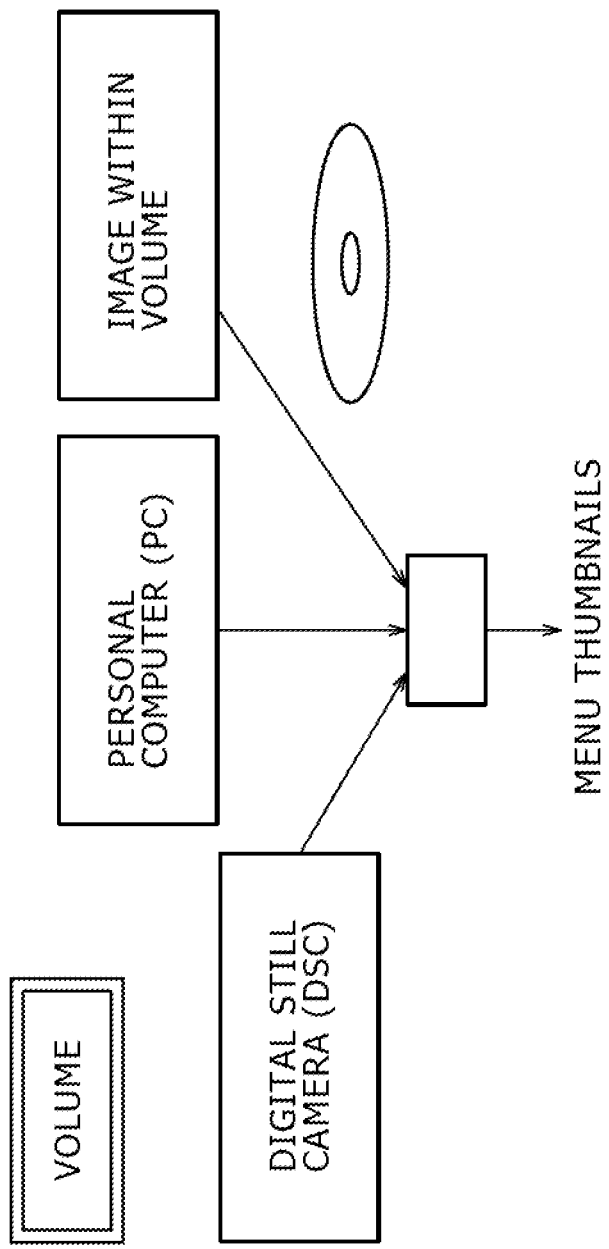
FIG. 11 is a block diagram explaining menu thumbnails.

Although it is expected that the first image of the PlayList is made the thumbnail (representative image) as the representative image concerned of the PlayList, an image at the head of the reproduction time 0 is not necessarily an optimal image for representing the contents. Then, the user is enabled to set an arbitrary image as the thumbnail of the PlayList. With that, the two kinds of thumbnails are referred to as "menu thumbnails." Since the menu thumbnails are frequently displayed on the display device, the menu thumbnails need to be read out from the disk at a high speed. For this reason, it is efficient to store all of the menu thumbnails in one file. The menu thumbnails need not to be pictures drawn out from a moving image within the volume. Thus, as shown in FIG. 11, the menu thumbnails may be images which are fetched in either from a personal computer or from a digital still camera.

On the other hand, plural marks need to be brought to both of the Clip and the PlayList. For this reason, for the purpose of knowing the contents of mark positions, an image at a mark point need to be enabled to be readily viewed. Pictures representing such mark points are referred to as "Mark Thumbnails." Therefore, with regard to the image becoming the source of the thumbnail, an image which is obtained by drawing out the image at the mark point becomes main rather than an image which is fetched in from the outside.

Figure 12:
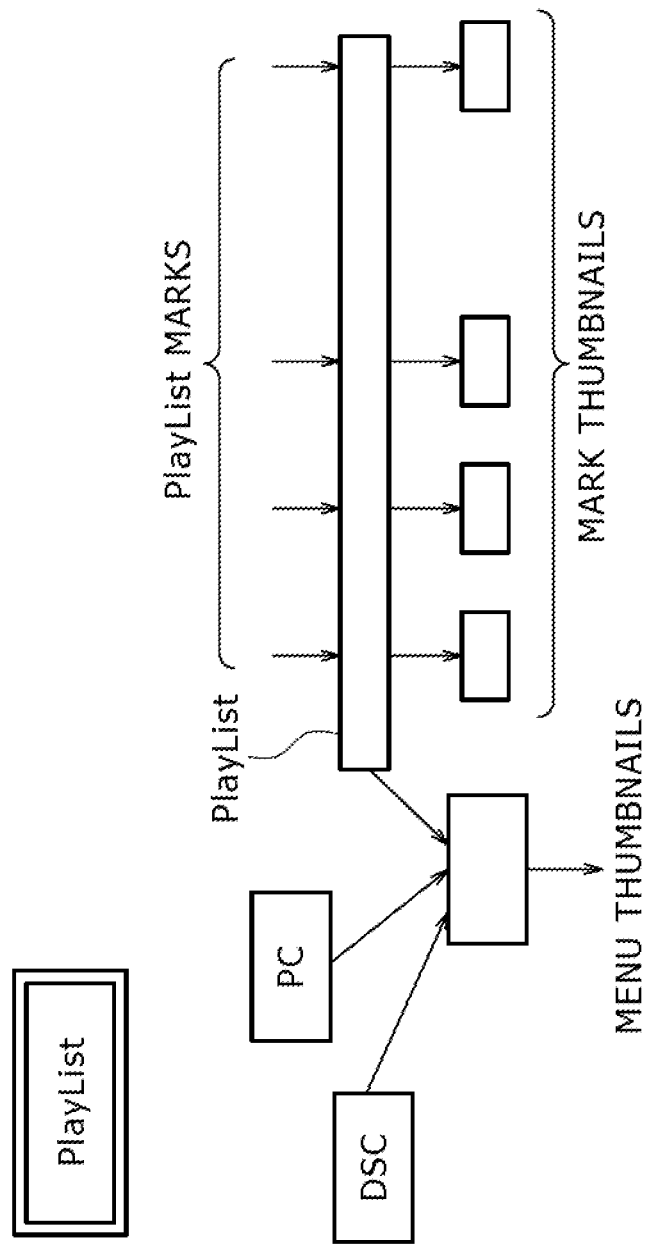
FIG. 12 is a block diagram explaining a mark added to the PlayList.
Figure 13:
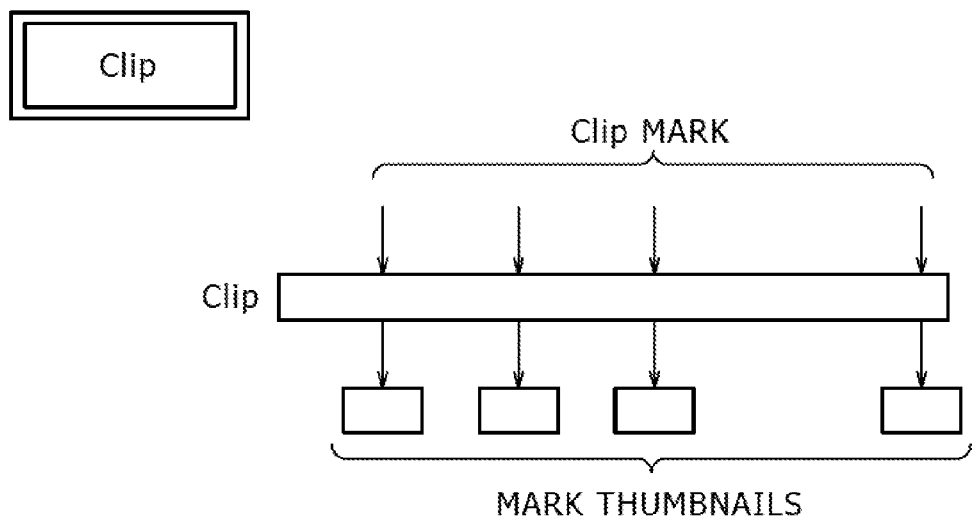
FIG. 13 is a block diagram explaining a mark added to the Clip.

FIG. 12 is a block diagram showing an relationship between a mark added to a PlayList, and a mark thumbnail thereof. FIG. 13 is a block diagram showing an relationship between a mark added to a Clip, and a mark thumbnail thereof. Since unlike the menu thumbnails, the mark thumbnails are used in the sub-menu or the like when the details of the PlayList are shown, it is not required for the mark thumbnails to read out the mark thumbnails for a short access time. For this reason, even when the recording/reproducing apparatus 1 opens the file whenever the thumbnail is required, and it takes some time to read out a part of the file, this is not a problem.

In addition, for the purpose of reducing the number of files existing within the volume, all it takes is that all of the mark thumbnails are stored in one file. The PlayList can have one menu thumbnail and plural mark thumbnails. However, since it is unnecessary for the user to directly select the Clip (normally, the Clip is specified via the PlayList), it is unnecessary to provide any of the menu thumbnails.

Figure 14:
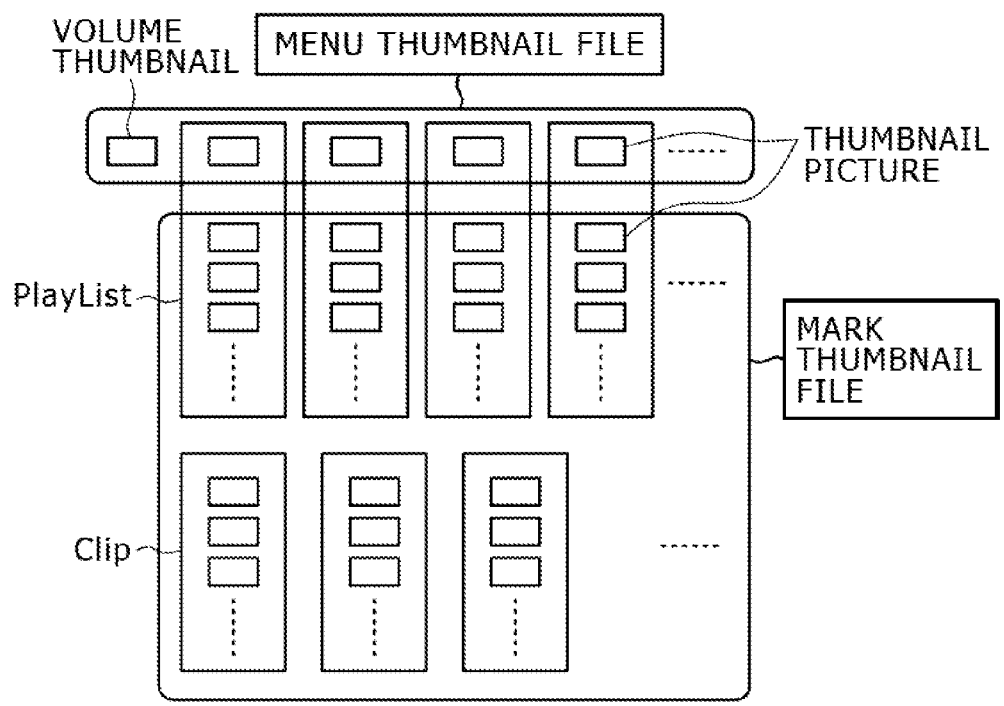
FIG. 14 is a block diagram explaining a relationship among a PlayList, a Clip, and a thumbnail file.

FIG. 14 is a block diagram showing a relationship among the menu thumbnails, the mark thumbnails, the PlayLists, and the Clips when the foregoing is taken into consideration. The menu thumbnail provided every PlayList is filed in the menu thumbnail file. A volume thumbnail representing the contents of the data recorded in the disk is contained in the menu thumbnail file. The thumbnail files created every PlayList and every Clip are filed in the mark thumbnail file.

[CPI]

Next, Characteristic Point Information (CPI) will be described below. The CPI is data contained in a Clip information file. Also, the CPI is mainly used to find out a data address in which the data is to be started to be read out from a Clip AV stream file when a time stamp of an access point to the Clip is given. In the first embodiment, there are used two kinds of CPIs: an EP_map; and a TU_map.

The EP_map is a list of entry point (EP) data, and is extracted from both of an elementary stream and a transport stream. Also, the EP_map has address information used for finding out a place of an entry point at which the decoding is to be started in the AV stream. One piece of EP data is composed of a pair of presentation time stamp (PTS), and data address in the AV stream of an access unit corresponding to the PTS.

The EP_map is mainly used for two objects. Firstly, EP_map is used to find out the data address in the AV stream of the access unit which is referred by the presentation time stamp in the PlayList. Secondly, the EP_map is used for fast-forward reproduction and fast-reverse reproduction. In the case where the recording/reproducing apparatus 1 records the input AV stream in the recording medium 100, when the syntax of the input AV stream can be analyzed, the EP_map is created to be recorded in the disk.

The TU_map has a list of time unit (TU) data based on arrival time of a transport packet inputted through a digital interface. This gives a relationship between arrival time based time, and a data address in the AV stream. In the case where the recording/reproducing apparatus 1 records the input AV stream in the recording medium 100, when it may be impossible to analyze the syntax of the input AV stream, the TU_map is created to be recorded in the disk.

STCInfo stores therein discontinuous point information of the STC in the AV stream file in which the MPEG2 transport stream is stored. When the AV stream has the discontinuous point of the STC, the PTSs having the same value might appear in the AV stream file concerned. For this reason, when certain time on the AV stream is pointed to on the PTS basis, it is insufficient to specify the point by only the PTS of the access point. In addition, an index for the continuous STC section containing therein the PTS concerned is necessary. The continuous STC section is called STC-sequence in this format, and the index for the continuous STC section is called STC-sequence-id. Information on STC_sequence is defined by STCInfo of the Clip Information file. STC-sequence-id is used in the AV stream file having the EP_map, and is also an option in the AV stream file having TU_map.

A program is an assembly of elementary streams which in turn share only one system time base for carrying out the synchronous reproduction of these streams. For the reproducing apparatus (the recording/reproducing apparatus shown in FIG. 1), it is useful to be aware of the contents of the AV stream prior to the decoding of the AV stream. The contents of the AV stream, for example, include a value of PID of the transparent packet with which an elementary stream of a video or audio is transmitted, and information on a kind of component of a video or audio (such as a video of HDTV, and an audio stream of MPEG-2 AAC), and the like. This information is useful in creating a menu picture explaining the contents of the PlayList, for the user, which refers to the AV stream. Also, this information is useful in setting initial states of the AV decoder and the demultiplexer of the reproducing apparatus prior to the decoding of the AV stream. For this reason, the Clip Information file has ProgramInfo for explaining the contents of the program.

In the AV stream file in which the MPEG2 transport stream is stored, the contents of the program might be changed in the file. For example, the PID of the transport packet with which the video elementary stream is transmitted is changed, the kind of component of the video stream is changed from the SDTV to the HDTV, and so forth.

ProgramInfo stores therein information on a change point of the program contents within the AV stream file. A section in which the program contents defined by the format concerned are constant in the AV stream file is called a Program_sequence. The Program_sequence is used in the AV stream file having the EP_map, and is an option in the AV stream file having the TU_map.

In the first embodiment, a stream format of a self-encode (SESF) is defined. The SESF is used for the purpose of encoding the analog input signal, and is also used when the digital input signal (for example, the DV) is encoded into the MPEG2 transport stream after having been decoded.

The SESF defines an encoding limit of the elementary stream with respect to both of the MPEG-2 transport stream and the AV stream. When the recording/reproducing apparatus 1 encodes the SESF stream and records the resulting encoded SESF stream, the EP_map is created and is then recorded in the disk.

Any one of the following systems is used for the stream of the digital broadcasting and information thereon is then recorded in the recording medium 100. Firstly, the stream of the digital broadcasting is transcoded into the SESF stream. In this case, the stream recorded need to conform to the SESF. In this case, EP_map needs to be created to be recorded in the disk.

Alternatively, the elementary stream composing the stream of the digital broadcasting is transcoded into a new elementary stream, and is remultiplexed into a new transport stream conforming to the stream format decided by the organization for normalizing the digital broadcasting stream concerned. In this case, the EP_map needs to be created to be recorded in the disk.

For example, it is supposed that the input stream is the MPEG-2 transport stream conforming to the ISDB (the standard name of the digital BS broadcasting in Japan), and the input stream includes the HDTV video stream and the MPEG AAC audio stream. The HDTV video stream is transcoded into a SDTV video stream, and the resulting SDTV video stream and an original AAC audio stream are remultiplexed into a TS. Both of the SDTV video stream and the transport stream recorded need to conform to the ISDB format.

In the case where the input transport stream is recorded in the transparent (the input transport stream is recorded without changing the input transport stream at all) by utilizing the other system when the stream of the digital broadcasting is recorded in the recording medium 100, when the syntax of the stream can be analyzed, the EP_map is created to be recorded in the disk.

Alternatively, in the case where the input transport stream is recorded in the transparent (the input transport stream is recorded without changing the input transport stream at all), when it may be impossible to analyze the syntax of the stream, the TU_map is created to be recorded in the disk.

[Directories and Files]

Figure 15:
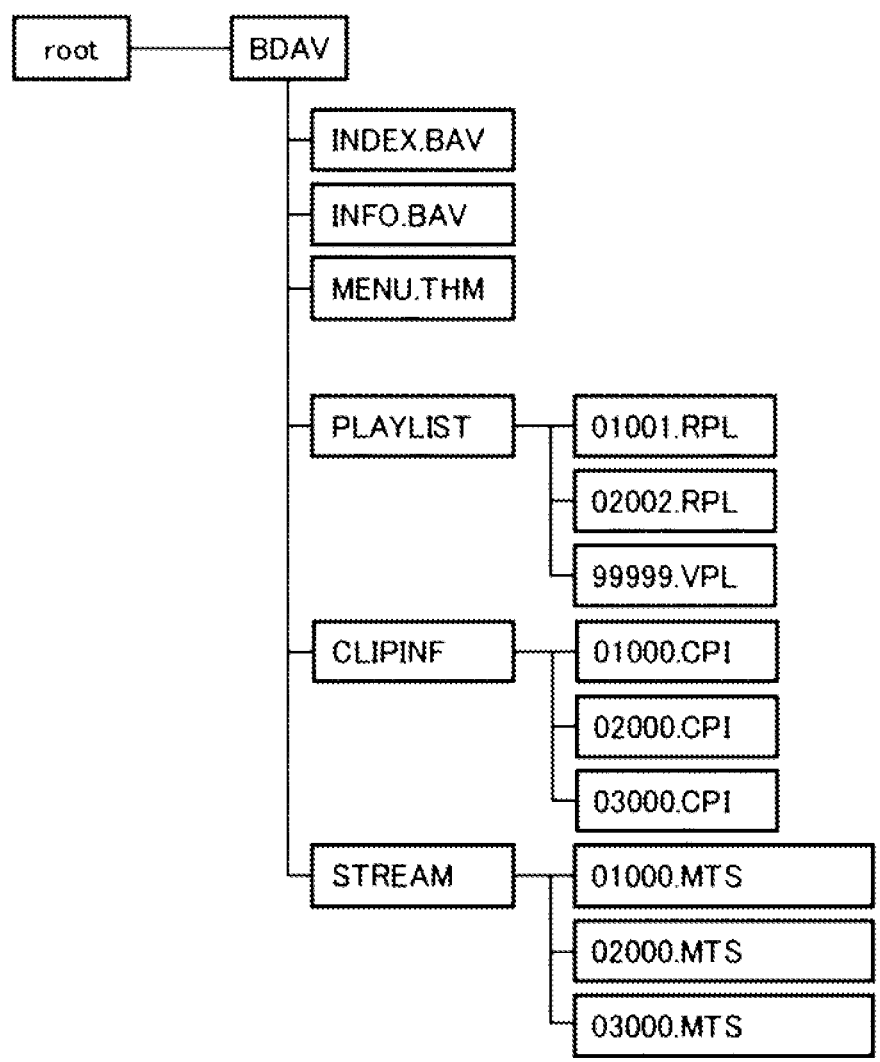
FIG. 15 is a block diagram explaining a directory structure.

Next, a directories and files will be described below. Hereinafter, the recording/reproducing apparatus 1 is suitably described as a Digital Video Recording (DVR). FIG. 15 is a diagram showing an example of a directory structure on a disk. As shown in FIG. 15, the directories necessary on the disk of the DVR are a root directory including a "BDAV" directory, a "PLAYLIST" directory, a "CLIPINF" directory, and a "STREAM" directory. Although directories other than those directories may also be created under the root directory, it is supposed that such directories are disregarded in the application format on the first embodiment.

All of the files and directories which are regulated by the DVR application format are stored under the "BDAV" directory. The "BDAV" directory includes three directories. The database files of both of the Real PlayList and the Virtual PlayList are placed under the "PLAYLIST" directory. The "PLAYLIST" directory exists even in the absence of one PlayList.

The database of the Clip is placed under the "CLIPINF" directory. The "CLIPINF" directory exists in the absence of even one Clip. An AV stream file is placed under the "STREAM" directory. The "STREAM" directory exists in the absence of even one AV stream file.

The "BDAV" directory stores therein the following files. An "INDEX.BAV" file is an index file in which display information useful in displaying a title list in information on an UIAppInfoPlayList( ) is extracted and collected with respect to all of the PlayList files placed under the PLAYLIST directory. In this case, extra private data on a maker for each PlayList file can also be stored in the "INDEX.BAV" file. An "INDEX.BAV" file is located under the BDAV directory as the same parental directory as that of the PLAYLIST directory in which the contents are recorded, and is also located in the same line as that of the PLAYLIST directory. In a word, both of the "INDEX.BAV" file and the PLAYLIST directory are brotherly directories. Details of the "INDEX.BAV" file will be described later with reference to FIG. 17.

An "INFO.BAV" file is created under the BDAV directory, and the entire information on the application layer is stored in the "INFO.BAV" file. Only one INFO.BAV needs to exist under the BDAV directory. A file name thereof is fixed to INFO.BAV. Information on a menu thumbnail image (a thumbnail image of a contents list) is stored in a "MENU.THM" file. A zero or one menu thumbnail needs to exist under the BDAV directory. A file name thereof is fixed to MENU.THM. When there is no menu thumbnail image, this file may not exist.

Two kinds of PlayList files are stored in a "PLAYLIST" directory. The two kinds of PlayList files are a Real PlayList and a Virtual PlayList. Information on one Real PlayList is stored in an "xxxxx.RPL" file. One file is created for every Real PlayList. A file name thereof is "xxxxx.RPL." Here, "xxxxx" is five numeric characters of 0 to 9. It is supposed that a file extension needs to be an "RPL."

Information on one Virtual PlayList is stored in a "yyyyy.VPL." One file is created for every Virtual PlayList. A file name thereof is "yyyyy.VRL." Here, "yyyyy" is five numeric characters of 0 to 9. It is supposed that a file extension needs to be a "VPL."

One file is stored in a "CLIPINF" directory so as to correspond to the AV stream file. A "zzzzz.CPI" file is a Clip Information file corresponding to one AV stream file (either a Clip AV stream file or a Bridge-Clip AV stream file). A file name thereof is "zzzzz.CPI." Here, "zzzzz" is five numeric characters of 0 to 9. It is supposed that a file extension needs to be "CPI."

A file of the AV stream is stored in a "STREAM" directory. A "zzzzz.MTS" file is the AV stream file with which the DVR system deals. The "zzzzz.MTS" file is either a Clip AV stream file or a Bridge-Clip AV stream. A file name thereof is "zzzzz.MTS." Here, "zzzzz" is five numeric characters of 0 to 9. It is supposed that a file extension needs to be "MTS."

[INDEX.BAV File]

Next, the "INDEX.BAV" file shown in FIG. 15 will be described below. For the purpose of causing the user to select a program as the contents recorded in the recording medium 100, a title list of programs (that is, a list of PlayLists) is created, a range, which can be displayed, of the title list of the programs is extracted, information on the range is outputted to the user interface input/output through the terminal 24 to be displayed. Alternatively, the information on the range is outputted to the display device (not shown) through the terminal 32, so as to be displayed thereon. As will be desired later with reference to FIG. 17, display information on all of the programs necessary for displaying a title list is collectively stored in one "INDEX.BAV" file. As a result, it becomes possible to speedily create and display the title list.

Figure 16:
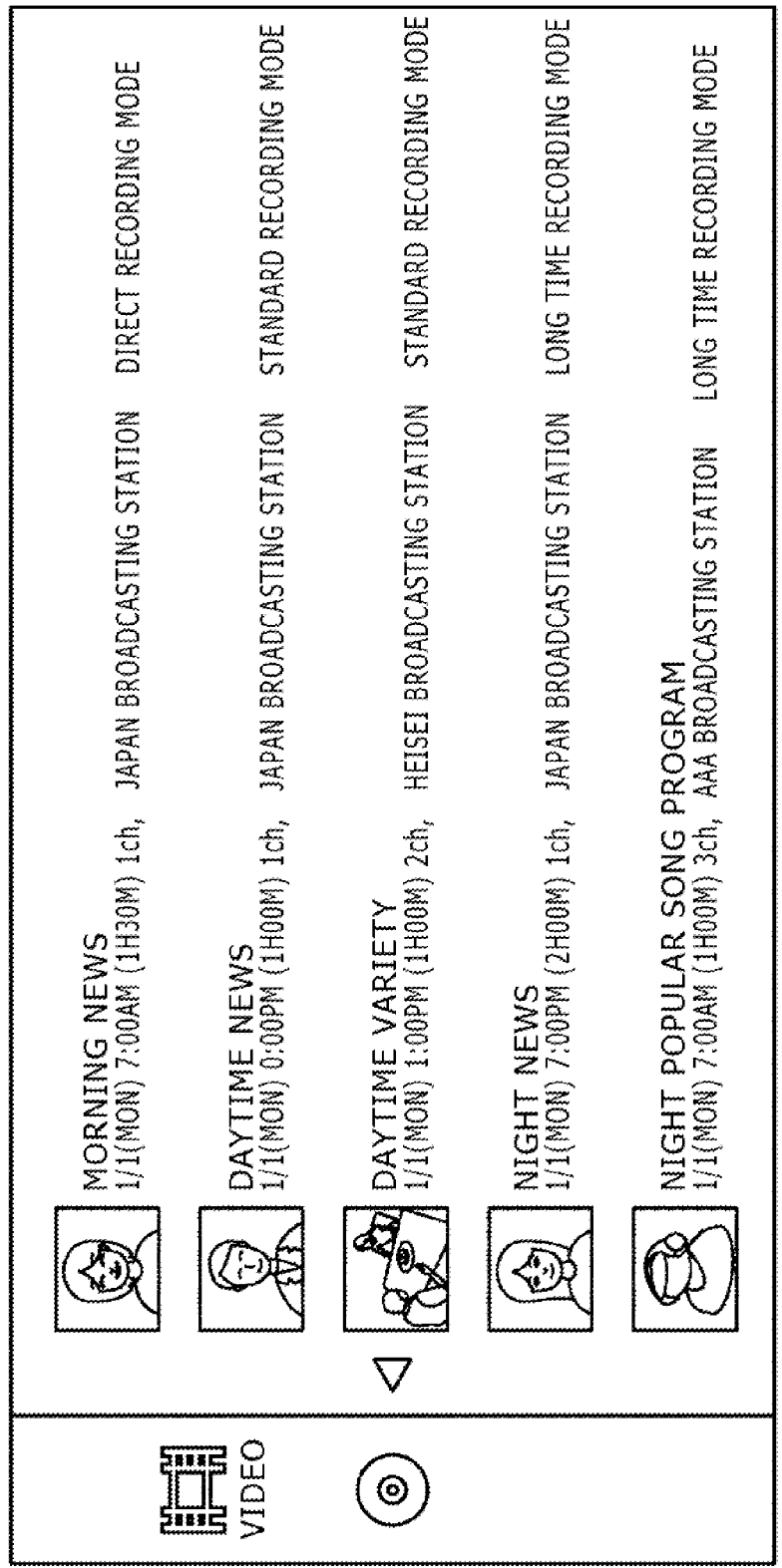
FIG. 16 is a diagram showing an example of display of a title list.

FIG. 16 is a diagram showing an example of display of the title list. Both of a design and display contents of the picture display depend on the maker of the recording/reproducing apparatus 1. In the display example, the following display information is displayed.

Title of Program: Morning News, Daytime News, Daytime Variety, Night News, Night Popular Song Program Recording Date and Time: January 1 (Mon) 7:00 AM, January 1 (Mon) 0:00 PM, January 1 (Mon) 1:00 PM, January 1 (Mon) 7:00 PM, January 1 (Mon) 9:00 PM Duration of Program: an hour and a half, an hour, two hours Channel Number: 1ch, 2ch, 3ch Channel Name: Japan Broadcasting Station, AAA Broadcasting Station Channel Mode: Direct Recording Mode, Standard Recording Mode, Long Time Recording Mode The display information as information such that the user can reliably select a desired program (that is, a title) needs to be displayed on the title list. The display information, for example, can contain therein the following information.

1. Name of Title (Program) (PlayList_name)
2. Recording Date and Time (time_zone, record_time_an-d_date)
3. Duration of Title (PlayList_duration)
4. Thumbnail Reference Information (ref_to_menu_thumbnail_index)
5. Mark relating to Whether or not It is New (unviewed) Record (is_played_flag)
6. Channel Number (channel_number)
7. Name of Channel (channel_name)

Information, which is especially essential to the title, of the seven pieces of display information described above is three pieces of display information indicated by numbers 1 to 3. The display information indicated by a number 4 is also important for causing the user to understand the contents of the program.

The names of the fields shown in round brackets following the seven pieces of the display information described above are names of fields appearing in the UIAppInfoPlayList( ) (refer to FIG. 25) except for ref_to_menu_thumbnail_index. Only ref_to_menu_thumbnail_index is not contained in the UIAppInfoPlayList( ). The reason for this is because a value of a mark_type of PlayListMark( ) (refer to FIG. 27) in a PlayList file (refer to FIG. 22) is either 0x01 or 0x02 (refer to FIG. 28), and a value of ref_thumbnail_index (refer to FIG. 27) when it is shown that the image concerned is the playlist representative image is referred. In a word, the value of ref_thumbnail_index is set as ref_to_menu_thumbnail_index.

FIG. 17 is a table showing a syntax of INDEX.BAV. As shown in the figure, the "INDEX.BAV" file contains therein the following information.

Characters of "INDX" come in a field of type_indicator. A field of version_number represents four characters indicating a version number of the INDEX.BAV file. A field of length represents the number of bytes from right after the length field up to the last of the INDEX.BAV file. A numeric character of number_of_PlayLists needs to be equal to the number of PlayLists recorded in the PLAYLIST directory. A field of PlayList_file_name[k] represents a file name of the PlayList. It is noted that [k] is a variable which is incremented in a for-loop. A field of index_info_start_address[k] represents a head byte address of index_info[k]( ) with the number of relative bytes from the head byte of the INDEX.BAV file as a unit. The number of relative bytes is counted from zero.

A field of ref_to_menu_thumbnail_index[k] represents the information on the thumbnail image representing the PlayList indicated by PlayList_file_name[k]. When a field of ref_to_menu_thumbnail_index[k] takes a value other than "0xFFFF," the thumbnail image representing the PlayList is added to the PlayList concerned, and the information on the thumbnail image is stored in the MENU.THM file. On the other hand, when a field of ref_to_menu_thumbnail_index[k] takes a value of "0xFFFF," the thumbnail image representing the PlayList is not added to the PlayList concerned.

A field of PlayList_character_set[k] represents an encoding method for characters encoded in the fields of channel_name[k] and PlayList_name[k]. A flag of is_played_flag[k] represents presence or absence of the reproduction. When the flag of is_played_flag[k] is set to "1," the PlayList which PlayList_file_name[k] represents was reproduced once at least after completion of the recording thereof. On the other hand, when the flag is set to "0," the PlayList which PlayList_file_name[k] represents has never even been reproduced after completion of the recording thereof. A field of time_zone[k] represents a time zone (for example, Japan, England or the like) of the time information indicated by record_time_and_date[k].

A field of record_time_and_date[k] is a 56-bit field in which information on the date and time when the PlayList which PlayList_file_name[k] represents was recorded. This field is obtained by encoding 14 characters into 4-bit Binary Coded Decimal (BCD) with respect to year/month/date/hour/minute/second. For example, 2001/12/23:01:02:03 is encoded into "0x20011223010203." A field of PlayList_duration[k] is a 24-bit field in which the total reproduction time of the PlayList which PlayList_file_name[k] represents is represented in units of hour/minute/second. This field is obtained by encoding six numeric characters into 4-bit Binary Coded Decimal (BCD). For example, 01:45:30 is encoded into "0x014530."

A field of channel_number[k] represents either a channel number or a service number of a broadcasting which the user selected when the PlayList which PlayList_file_name[k] indicates was recorded. When a value of this field is 0xFFFF, this field is invalid. A field of channel_name_length[k] represents the number of bytes of a length of a channel name which the channel_name[k] field indicates. A field of channel_name[k] represents either a channel name or a service name of a broadcasting which the user selected when the PlayList which PlayList_file_name[k] indicates was recorded.

A field of PlayList_name_length[k] represents the number of bytes of a length of the PlayList name which the field of PlayList_name[k] indicates. A field of PlayList_name[k] represents a title (program) of the PlayList which PlayList_file_name[k] indicates.

When a field value of length_mpd[k] is not zero, mdp[k]( ) exists, and a value thereof represents the number of bytes of mdp[k]( ). A field of maker_ID[k] represents a maker of a recorder in which mdp[k]( ) is recorded. A value encoded into maker_id is allocated by a licenser of this format. A field of maker_model_code[k] represents a model number of the recorder in which mdp[k]( ) is recorded. A value encoded into maker_model_code[k] is determined by a maker receiving a license of this format. The field of maker_private_data[k] is a region in which maker private data is stored. In addition to the information described above which is standardized by using the INDEX.BAV file, the recording information which is unique in the maker may be stored in the field of maker_private_data[k]. For example, the information such as a recording mode (information such as a standard recording mode and a long time recording mode) and a category of a program is recorded in the field of maker_private_data[k].

Length_mpd[k], maker_ID[k], maker_model_code[k], and maker_private_data[k] compose the maker unique information.

X and Y are arbitrary positive integer numbers, respectively. A value of padding_word can get any of values.

[INFO.BAV]

FIG. 18 is a table showing a syntax of the "INFO.BAV" file. The "INFO.BAV" file is composed of three objects: UIAppInfoBDAV( ); TableOfPlayLists( ); and ExtensionData( ).

The syntax of INFO.BAV shown in FIG. 18 will now be described.

Characters of "INFO" come in the field of type_indicator. A field of version_number represents four characters indicating a version number of the INFO.BAV file. The field of TableOfPlayLists_Start_address represents a head address of TableOfPlayList( ) with the number of relative bytes from the head byte of the INFO.BAV file as a unit. The number of relative bytes is counted from zero.

A field of ExtensionData_Start_address represents a head address of ExtensionData( ) with the number of relative bytes from the head byte of the INFO.BAV file as a unit. The number of relative bytes is counted from zero. padding_word (padding word) is inserted in accordance with the syntax of info.dvr. N1 and N2 are either zero or arbitrary positive integer numbers, respectively. The respective padding words may get arbitrary values, respectively.

A file name of the PlayList (the Real PlayList and the Virtual PlayList) is stored in the field of TableOfPlayLists( ). TableOfPlayLists( ) represents the reproduction order of defaults of the PlayList.

A field of ExtensionData( ) contains therein either private data for special applications of makers, or an extended database defined by the BDAV standard. Recorder makers may insert private data thereof into ExtensionData( ) for the special applications of the makers. The private data of the makers has maker identifiers which are standardized for the purpose of identifying the makers which had defined the private data, respectively. In addition, PL_to_Clips_table( ) which will be described later is recorded as an extended database defined by the BDAV standard in ExtensionData( ) of the INFO.BAV file.

[ExtensionData( )]

FIG. 19 is a table showing a syntax of ExtensionData( ). The syntax of ExtensionData( ) shown in FIG. 19 will be described below.

A field of length represents the number of bytes from right after the length field up to the last of ExtensionData( ). The field of data_block_start_address represents a head byte address of data_block( ) with the number of relative bytes from a head byte of ExtensionData( ) as a unit. The number of relative bytes is counted from zero.

A field of number_of_ext_data_entries represents the number of entries of ext_data_entry( ) contained in ExtensionData( ). Value 0x0000 to 0x00FF of ID1 are used to identify the extended database defined by the BDAV standard. When the values of ID1 are beyond the range of 0x0000 to 0x00FF, the value of ID1 represents a manufacturer of a recorder in which the maker private data is created. A value of the maker identification is specified by the licenser of the BDAV format. When the value of ID1 is in the range of 0x0000 to 0x00FF, ID2 is used to identify the extended database defined by the BDAV standard. The value of ID1 is beyond the range of 0x0000 to 0x00FF, ID2 represents a model number code of the recorder in which the maker private data is created. In this case, a value which is encoded into ID2 is determined by a manufacturer receiving the license of the format. The values of ID1 and ID2 which are used to identify PL_to_Clips_table( ) are 0x00F0 and 0x0001, respectively.

A field of ext_data_start_address represents a byte address at which extension data starts with the number of relative bytes of a head byte of the ExtensionData( ) as a unit. The number of relative bytes is counted from zero. A field of ext_data_length represents a size of data in increments of bytes of extension data. A value of padding_word can get any of values.

FIG. 20 is an expression showing an example of a syntax of the ExtensionData( ), and showing an image of PL_to_Clips_table( ) which is recorded in ExtensionData( ). As shown in the figure, PL_to_Clips_table( ) is recorded in ExtensionData( ).

data_block_start address represents an address of a head byte of data_block( ) within ExtensionData( ). In this example, since only one piece of PL_to_Clips_table( ) as extension data is recorded in ExtensionData( ), 1 is set in number_of_ext_data_entries. The values of ID1 and ID2 which are used to identify PL_to_Clips_table( ) are 0x00F0 and 0x0001, respectively.

ext_data_start_address represents an address of a head byte of PL_to_Clips_table( ) within ExtensionData( ) (which has the same value as the address of the head byte of data_block( ) in this example). ext_data_length represents a byte length of PL_to_Clips_table( ). PL_to_Clips_table( ) is recorded in data_block( ).

[PL_to_Clips_Table( )]

FIG. 21 shows a syntax of PL_to_Clips_table( ) which is recorded in ExtensionData( ) of the INFO.BAV file. PL_to_Clips_table( ) is a table in which Clip Information file(s) which the individual PlayList files refer is(are) listed with respect to all of the PlayList files which are recorded under the PLAYLIST directory.

The field of length represents the number of bytes from right after this length field up to the last of PL_to_Clips_table( ). A numeric value of the field of number_of_PlayLists needs to be equal to the number of PlayLists recorded in the PLAYLIST directory. The field of PlayList_file_name[k] represents a file name of the PlayList.

A field of Clips_table_start_address[k] represents an address of a head byte of Clip_table[k]( ) with the number of relative bytes from the head byte of PL_to_Clips_table( ) as a unit. The number of relative bytes is counted from 0. A field of number_of_PlayItems[k] represents the number of PlayItems existing in the PlayList which PlayList_file_name[k] indicates.

A field of Clip_Information_file_name[k][i] represents a file name of Clip Information file which the PlayItems existing the PlayList which PlayList_file_name[k] indicates refers. A value of the padding_word can get any of values.

[Real PlayList File and Virtual PlayList File]

Next, a description will be given below with respect to a Real PlayList file and a Virtual PlayList file, that is, xxxxx.RPL and yyyyy.VPL of the "PLAYLIST" directory shown in FIG. 15. FIG. 22 is a table showing a syntax of either xxxxx.RPL (Real PlayList) or yyyyy.VPL (Virtual PlayList). xxxxx.RPL and yyyyy.VPL have the same syntax structure. Each of xxxxx.RPL and yyyyy.VPL is composed of three objects: PlayList( ); PlayListMark( ); and MakerPrivateData( ).

PlayListMark_Start_address represents a head address of PlayListMark( ) with the number of relative bytes from a head byte of the PlayList file as a unit. The number of relative bytes is counted from zero.

MakerPrivateData_Start_address represents a head address of MakerPrivateData( ) with the number of relative bytes from a head byte of the PlayList file as an unit. The number of relative bytes is counted from zero.

padding_word (padding word) is inserted in accordance with the syntax of the PlayList file. N1 and N2 are either zero or arbitrary positive integer numbers, respectively. The respective padding words may get arbitrary values, respectively.

Although having already been simply described, here, the Playlist will be further described below. All of the reproduction sections within all of the Clips except for Bridge-Clip need to be referred by all of the Real PlayList existing in the recording medium 100. In addition thereto, the reproduction sections represented by these PlayItems of two or more Real PlayLists should not be overlapped in the same Clip by the two or more PlayLists.

Figure 23A:
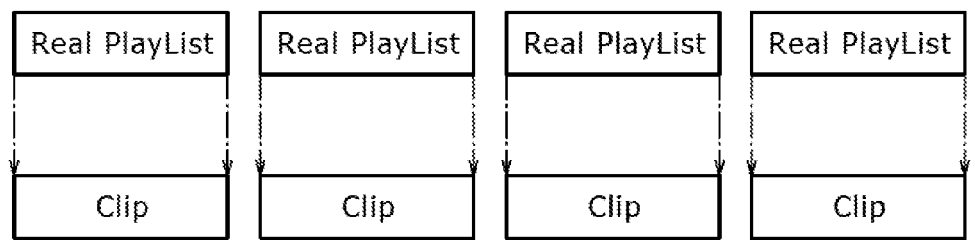
FIGS. 23A to 23C are respectively diagrams explaining a PlayList.
Figure 23B:
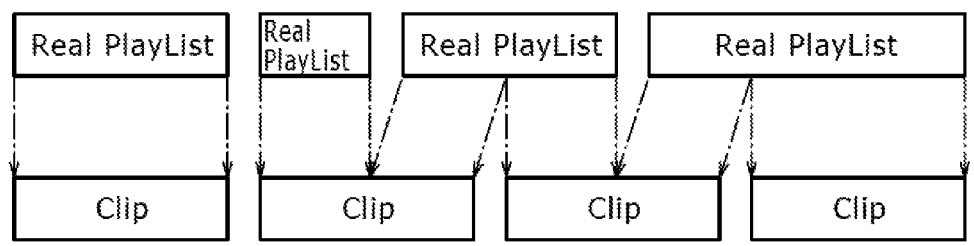
Figure 23C:
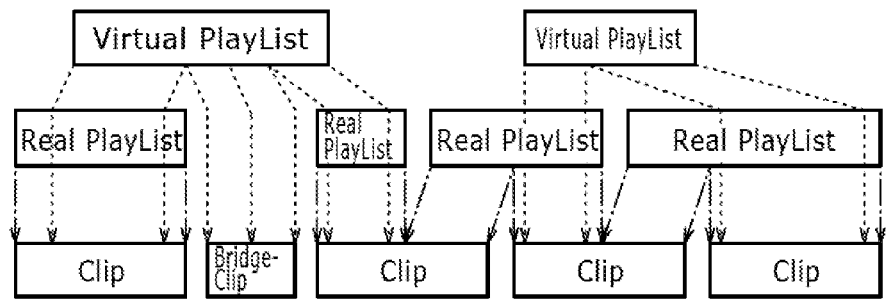

In further giving a description with reference to FIGS. 23A to 23C, as shown in FIG. 23A, for all of the Clips, corresponding Real PlayLists exist. As shown in FIG. 23B, this rule is kept even after the editing work is carried out. Therefore, all of the Clips can be necessarily looked and listened by referring to any ones of the Real PlayLists.

As shown in FIG. 23C, the reproduction section of the Virtual PlayList needs to be contained either in the reproduction section of the Real PlayList or in the reproduction section of the Bridge-Clip. The Bridge-Clip which is referred by none of the Virtual PlayLists should not exist in the disk.

Although the Real PlayList contains therein the list of the PlayItems, the Real PlayList should not contain therein the SubPlayItem. When the Virtual PlayList contains therein the list of the PlayItems, and the CPI_type and the PlayList_type each shown in the PlayList( ) are the EP_map type and 0 (the PlayList containing therein both of the video and the audio), respectively, the Virtual PlayList can contain therein one SubPlayItem. In the PlayList( ) in the first embodiment, the SubPlayItem is used only for the dubbing of the audio. Also, the number of SubPlayItems which one Virtual PlayList has need to be either 0 or 1.

[Syntax of PlayList]

Next, a syntax of the PlayList will be described below. FIG. 24 is a table showing a syntax of the PlayList. In describing the syntax of the PlayList shown in FIG. 24, version_member is four characters representing the version number of the PlayList( ). version_number needs to be encoded into "0045" in accordance with ISO 646, length is a 32-bit unsigned integer number representing the number of bytes of PlayList( ) from right after the length field up to the last of PlayList( ).

PlayList_type is an 8-bit field representing a type of the PlayList.

CPI_type is a 1-bit flag and represents a value of CPI_type of the Clip which both of the PlayItem( ) and the SubPlayItem( ) refer. For all of the Clips referred by one PlayList, values of CPI_type defined in CPI( ) of all of the Clips need to be equal to one another. number_of_PlayItems is a 16-bit field representing the number of PlayItems existing in the PlayList.

PlayItem_id corresponding to a predetermined PlayItem( ) is defined by the order in which the PlayItem( ) appears in a for-loop containing therein the PlayItems( ). PlayItem_id begins with 0. number_of_SubPlayItems is a 16-bit field representing the number of SubPlayItems existing in the PlayList. This value is either 0 or 1. A path (audio stream path) of an additional audio stream is one kind of sub-path.

[UIAppInfoPlayList]

Next, a description will be given with respect to UIAppInfoPlayList of the syntax of the PlayList shown in FIG. 24. Parameters of a user interface application about the PlayList are stored in UIAppInfoPlayList. FIG. 25 is a table showing a syntax of UIAppInfoPlayList. A description will be given below with respect to the syntax of UIAppInfoPlayList.

A field of PlayList_character_set represents an encoding method for characters encoded in the channel_name and PlayList_name field. A field of is_played_flag represents presence or absence of the reproduction of the PlayList. When the flag is set to '1', the PlayList was reproduced once at least after completion of the recording thereof. On the other hand, when the flag is set to '0', the PlayList has never even been reproduced after completion of the recording thereof. A field of time_zone represents a time zone indicated by record_time_and_date.

A field of record_time_and_date is a 56-bit field in which information is stored on the date and time when the PlayList was recorded. This field is obtained by encoding 14 numeric characters into a 4-bit Binary Coded Decimal (BCD) with respect to year/month/date/hour/minute/second. For example, 2001/12/23:01:02:03 is encoded into "0x20011223010203." A field of PlayList_duration is a 24-bit field in which the total reproduction time of the PlayList is represented in units of hour/minute/second. The field is obtained by encoding six numeric characters into a 4-bit Binary Coded Decimal (BCD). For example, 01:45:30 is encoded into "0x014530."

A field of channel_number represents either a channel number or a service number of a broadcasting which the user selected when the PlayList was recorded. When a value of this field is 0xFFFF, this field is invalid. A field of channel_name_length represents the number of bytes of the length of the channel name which the channel_name field represents. A field of channel_name represents either a channel name or a service name of a broadcasting which the user selected when the PlayList was recorded. A field of PlayList_name_length represents the number of bytes of a length of the PlayList name. A field of the PlayList_name represents a title (program) of the PlayList indicated by PlayList_name.

[Syntax of PlayItem]

FIG. 26 is a table showing a syntax of the PlayItem. In describing the syntax of the PlayItem shown in FIG. 26, a field of Clip_Information_file_name represents a file name of a Clip Information file. Clip_stream_type defined in Clipinfo( ) of this Clip Information file needs to represent a Clip AV stream.

STC_sequence_id is an 8-bit field, and represents STC_sequence_id of an STC continuous section which the PlayItem refers. When CPI_type specified in PlayList( ) is a TU_map type, this 8-bit field has no significance and thus is set to 0. IN_time is a 32-bit field, and information on reproduction start time of the PlayItem is stored in IN_time. A semantics of IN_time differs depend on CPI_type defined in PlayList( ).

OUT_time is a 32-bit field, and information on reproduction end time of the PlayItem is stored in OUT_time. A semantics of OUT_time differs depend on CPI_type defined in PlayList( ).

Connection_Condition is a 2-bit field representing a connection state between a precedent PlayItem and a current PlayItem.

[PlayListMark( )]

Next, a description will be given below with respect to PlayListMark( ) within the syntax of xxxxx.RPL and yyyyy.VPL shown in FIG. 22. Mark information on the PlayList is stored in the PlayListMark. FIG. 27 is a table showing a syntax of the PlayListMark. In describing a syntax of the PlayListMark shown in FIG. 27, version_number is four characters representing a version number of the PlayListMark( ). version_number needs to be encoded into "0045" in accordance with ISO 646.

length is a 32-bit unsigned integer number representing the number of bytes of the PlayListMark( ) from right after the length field up to the last of the PlayListMark( ). number_of_Playlist_marks is a 16-bit unsigned integer number representing the number of marks stored in the PlayListMark. number_of_Playlist_marks may be 0. mark_type is an 8-bit field representing a type of a mark.

A time stamp representing a point in which a mark is specified is stored in a 32-bit field of mark_time_stamp. A semantics of mark_time_stamp differs depending on CPI_type defined in the PlayList( ). PlayItem_id is an 8-bit field specifying the PlayItem in which the mark is placed. A value of PlayItem_id corresponding to the predetermined PlayItem is defined in the PlayList( ) (refer to FIG. 24).

An 8-bit field of character_set represents an encoding method for characters which are encoded in the mark_name field. An 8-bit field of name_length represents a byte length of a mark name indicated in the field of mark_name. The field of mark_name represents a name of a mark. The number of bytes corresponding to the number of name_length from the left-hand side in the field of mark_name is effective characters, and represents a name of a mark. Any of values may be set in a value after these effective characters in the mark_name field.

A field of ref_thumbnail_index represents information on a thumbnail image added to a mark. When a field of ref_thumbnail_index is a value of not being 0xFFFF, the thumbnail image is added to the mark, and information on the thumbnail image is stored in the MENU.THM file. The image is referred by using the value of ref_thumbnail_index in the MENU.THM file. On the other hand, the field of ref_thumbnail_index is a value of 0xFFFF, which represents that no thumbnail image is added to the mark.

FIG. 28 is a diagram showing a table of mark_type. As shown in the figure, a type of a mark is regulated by a value of mark_type. When the value of mark_type is 0x01, the mark concerned is a representative image of the playlist, and the representative image is selected from a picture of a video which the PlayList refers.

In this case, mark_time_stamp (refer to FIG. 27) represents a Presentation time stamp of a picture in a video which the PlayList refers. When a value of ref_thumbnail_index (refer to FIG. 27) is a value other than xFFFF, the information on the thumbnail image is stored in the MENU.THM shown in FIG. 29 which will be described later. On the other hand, when the ref_thumbnail_index is a value of xFFFF, no information on the thumbnail image is stored in the MENU.THM shown in FIG. 29. In this case, the player may decode the picture specified by the Presentation time stamp within the video which the PlayList refers. A numeric value of a value 0x01 or 0x02 of a mark type of the PlayListMark( ) is either 0 or 1.

When the value of mark_type is 0x02, the mark is a PlayList representative image, and a PlayList representative image is not selected from the picture of the video which the PlayList refers.

In this case, the value of ref_thumbnail_index needs to be a value other than 0xFFFF. The information on the thumbnail image is stored in the MENU.THM shown in FIG. 29. Zero is set in each of mark_time_stamp and PlayItem_id. The numeric value of the value 0x01 or 0x02 of the mark type of the PlayListMark( ) is either 0 or 1.

When the value of mark_type is 0x03, the mark concerned is Resume-mark. This is a representative resume point. The number of reproduction resume points defined in the PlayListMark( ) needs to be either 0 or 1.

When the value of mark_type is 0x04, the mark concerned is a reproduction entry point of the PlayList. This mark can be set by the user and, for example, is used as a mark specifying a start point of a favorite scene for the user.

When the value of mark_type is 0x06, the mark concerned is a skip mark point. The player skips the program from this skip mark point to the last of the program. The number of skip mark points defined in the PlayListMark( ) needs to be either 0 or 1.

[MENU.THM]

FIG. 29 is a table showing a syntax of MENU.THM (or MARK.THM) shown in FIG. 15. In this case, the MENU.THM file has a Thumbnail( ).

FIG. 30 is a table showing a syntax of the Thumbnail( ) within the syntax of MENU.THM (or MARK.THM). In describing the syntax of the Thumbnail( ) shown in FIG. 29, version_number is four characters representing a version number of the Thumbnail( ). version_number needs to be encoded into "0045" in accordance with ISO 646.

length is a 32-bit unsigned integer number representing the number of bytes of the Thumbnail( ) from right after the length field up to the last of the Thumbnail( ). tn_blocks_start_address is a 32-bit unsigned integer number representing a head byte address of first tn_block with the number of relative bytes from a head byte of the Thumbnail( ) as a unit. The number of relative bytes is counted with zero, number_of_thumbnails is a 16-bit unsigned integer number giving the number of entries of the thumbnail image contained in the Thumbnail( ).

tn_block_size is a 16-bit unsigned integer number giving a size of one tu_block with 1024 bytes as a unit. For example, when a relation of tn_block_size=1 holds, this represents that a size of one tu_block is 1,024 bytes. number_of_tu_blocks is a 16-bit unsigned integer number representing the number of entries of tu_block within the Thumbnail( ). thumbnail_index is a 16-bit unsigned integer number representing an index number of the thumbnail image represented by the thumbnail information for one for-loop beginning with the thumbnail_index field. A value of 0xFFFF should not be used as thumbnail_index. thumbnail_index is referred by ref_thumbnail_index within an UIAppInfoVolume( ), a UIAppInfoPlayList( ), a PlayListMark( ), and a ClickMark( ).

thumbnail_picture_format is an 8-bit unsigned integer number representing a picture format of the thumbnail.

picture_data_size is a 32-bit unsigned integer number in which the byte length of the thumbnail image is represented in increments of bytes. start_tn_block_number is a 16-bit unsigned integer number representing tn_block_number of tn_block in which the data of the thumbnail image starts. The head of the thumbnail image data needs to agree with the head of tb_block. The tu_block number begins with 0, and is related to a value of a variable, k, within the for-loop of tn_block.

x_picture_length is a 16-bit unsigned integer number representing the number of pixels in a horizontal direction of a frame picture frame of the thumbnail image. y_picture_length is a 16-bit unsigned integer number representing the number of pixels in a vertical direction of the frame picture frame of the thumbnail image. tn_block is an area in which the information on the thumbnail image is stored. All of tn_blocks within the Thumbnail( ) have the same size (fixed length), and the size concerned is defined by tn_block_size.

[AV Stream File]

Next, the AV stream file will be described below. The AV stream file is stored in the MTS file of the "STREAM" directory (refer to FIG. 15). The AV stream file has two types: a Clip AV stream file; and a Bridge-Clip AV stream file. Both of the AV streams need to have a structure of a DVR MPEG-2 transport stream file.

[Recording Processing]

Figure 31:
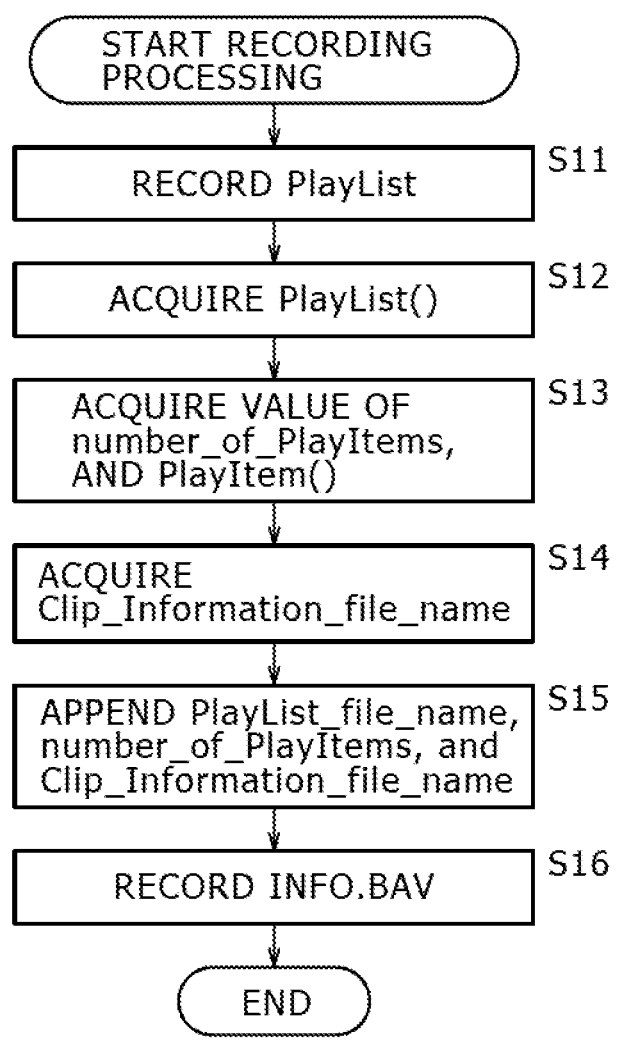
FIG. 31 is a flow chart explaining recording processing.

Next, a description will be given below with respect to processing for recording PL_to_Clips_table( ) in the recording medium 100 with reference to FIG. 31. FIG. 31 is a flow chart explaining the recording processing. When the program as the contents is recorded in the recording medium 100 in accordance with an instruction issued from the user, this recording processing is executed so as to be accompanied by the recording of the program in the recording medium 100.

In processing in Step S11, the recording portion 201 records the PlayList. In a word, either xxxxx.RPL or yyyyy.VPL shown in FIG. 22 and corresponding to the contents is recorded in the recording medium 100.

In processing in Step S12, the acquiring portion 202 acquires the PlayList( ). In a word, the PlayList( ) is read out from the PlayList (that is, either xxxxx.RPL or yyyyy.VPL shown in FIG. 22) which is recorded in the processing in Step S11 to be acquired.

In processing in Step S13, the acquiring portion 202 acquires both of the value of number_of_PlayItems, and the PlayItem( ). In a word, both of the value of number_of_PlayItems within the PlayList( ) (refer to FIG. 24) acquired in the processing in Step S12, and the PlayItem( ) (refer to FIG. 26) within the loop of number_of_PlayItems are read out.

In processing in Step S14, the acquiring portion 202 acquires Clip_Information_file_name. In a word, Clip_Information_file_name within the PlayItem( ) (refer to FIG. 26) acquired in the processing in Step S13 is read out.

In processing in Step S15, the appending portion 203 appends the file name of the PlayList, number_of_PlayItems, and Clip_Information_file_name. That is to say, PlayList_file_name as the name of the PlayList file recorded in the processing in Step S11, number_of_PlayItems acquired in the processing in Step S13, and Clip_Information_file_name as the name of the Clip Information file which the PlayList refers are all appended to the PL_to_Clips_table( ) (refer to FIG. 21).

In processing in Step S16, the recording portion 201 records the INFO.BAV. That is to say, the INFO.BAV file having PL_to_Clips_table( ) to which the predetermined pieces of information are appended in the processing in Step S15 is recorded in the recording medium 100.

[Deleting Processing]

Figure 32:
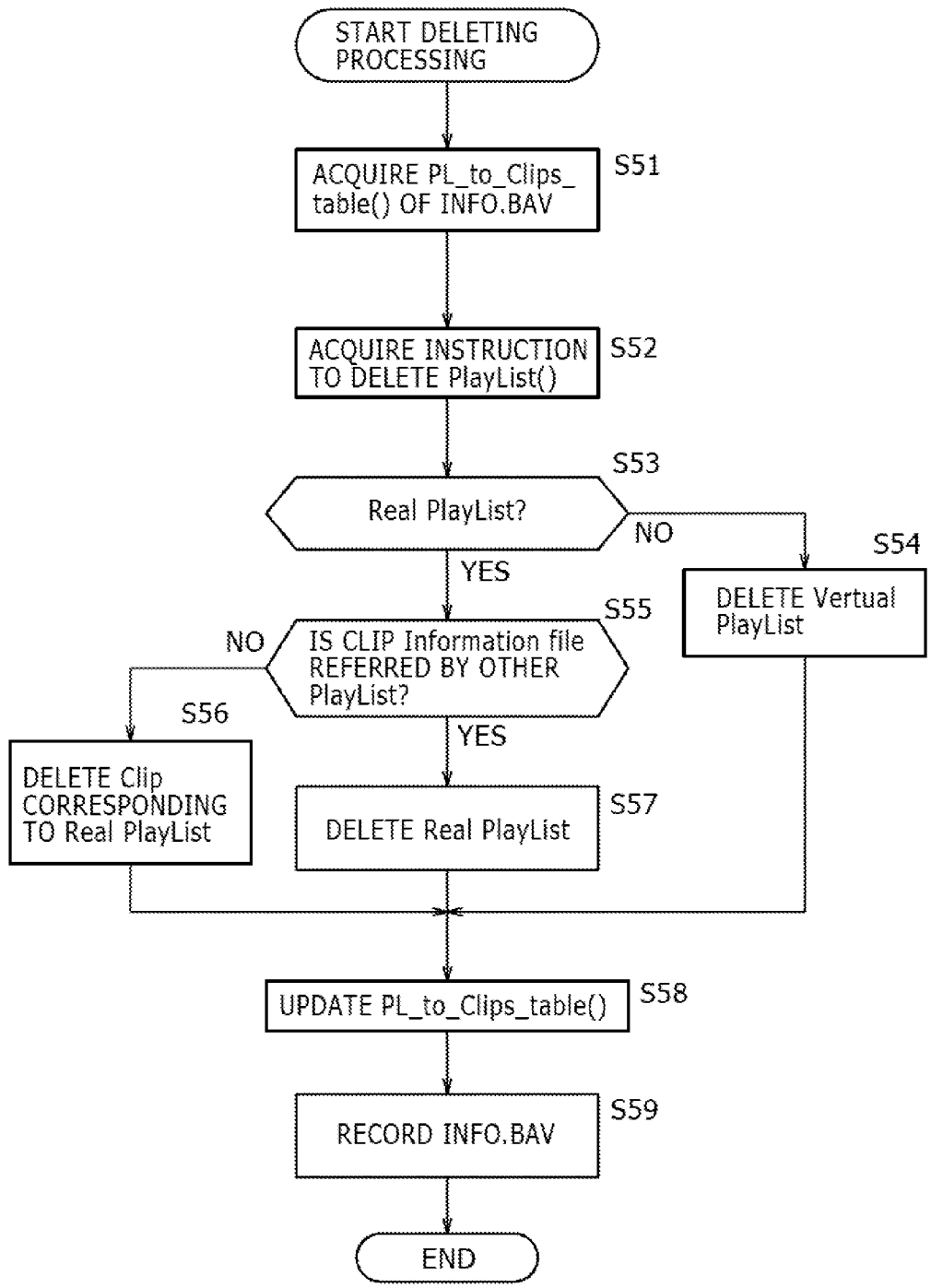
FIG. 32 is a flow chart explaining deleting processing.

Next, processing for deleting PL_to_Clips_table( ) will be described below with reference to FIG. 32. FIG. 32 is a flow chart explaining the deleting processing.

In processing in Step S51, the acquiring portion 202 acquires PL_to_Clip_table( ) of the INFO.BAV. In a word, the INFO.BAV file (refer to FIG. 18) recorded in the recording medium 100 in the processing in Step S16 shown in FIG. 30 is read out. In addition thereto, PL_to_Clips_table( ) (refer to FIG. 21) in data_block( ) (refer to FIG. 20) in the Extension-Data (refer to FIG. 19) in the INFO.BAV file is read out.

In processing in Step S52, the acquiring portion 202 acquires an instruction to delete the PlayList. In a word, when the user issues an instruction to delete the contents, the list (refer to FIG. 16) of the contents is displayed. The user specifies the contents (PlayList) as an object of the deletion from the list of the contents. The PlayList thus specified is acquired by the acquiring portion 202.

In processing in Step S53, the determining portion 204 determines whether or not the PlayList acquired in the processing in Step S52 is the Real PlayList.

When it is determined in the processing in Step S53 that the PlayList acquired in the processing in Step S52 (that is, the PlayList for which the deleting portion 205 is instructed to be deleted) is the Real PlayList, in processing in Step S55, the determining portion 204 determines whether or not the Clip Information file is referred by other PlayList(s). In a word, the determining portion 204 determines whether or not the Clip Information file which the PlayList as the object of the deletion (the Real PlayList in this case) refers is referred by other PlayList file(s) as well.

This determination is carried out based on the PL_to_Clips_table( ) acquired in the processing in Step S51. That is to say, the Clip Information file(s) which the individual PlayLists refer are listed with respect to all of the PlayLists recorded under the PLAYLIST directory in the PL_to_Clips_table( ). Therefore, it is possible to speedily determine whether or not the Clip Information file is referred by other PlayList(s) as well from the PL_to_Clips_table( ) concerned. In a word, the predetermined pieces of information which need to be checked when the contents are deleted are collectively held in one INFO.BAV file (specifically, the PL_to_Clips_table( ) in the INFO.BAV file). Therefore, even when the number of contents is large, it is possible to speedily delete the contents.

On the other hand, when it is determined in the processing in Step S51 that the Clip Information file to which the Real PlayList as the object of the deletion refers is not referred by other PlayList(s) as well, in processing in Step S56, the deleting portion 205 deletes both of the Real PlayList and the Clip corresponding thereto. In a word, there are deleted both of the Real PlayList for which the deleting portion 205 is instructed to be deleted, and the Clip (the Clip AV stream file corresponding to the Clip Information file) which is referred by the Real PlayList concerned. When there is the Virtual PlayList which refers the Clip deleted, it is possible to delete the Virtual PlayList concerned as well.

When the Clip Information file to which the Real PlayList as the object of the deletion refers is referred by other PlayList(s), in processing in Step S57, the deleting portion 205 deletes the Real PlayList concerned. In a word, although the Real PlayList for which the deleting portion 205 is instructed to be deleted is deleted, the Clip to which the Real PlayList concerned refers is not deleted because the Clip concerned is referred by other PlayList(s). The reason for this is because when the Clip is deleted, it may be impossible to carry out the reproduction based on other PlayList(s) which refers(refer) the Clip concerned.

When it is determined in the processing in Step S53 that the PlayList for which the deleting portion 205 is instructed to be deleted is not the Real PlayList, that is, the PlayList concerned is the Virtual PlayList, in processing in Step S54, the deleting portion 205 deletes the Virtual PlayList concerned (the PlayList for which the deleting portion 205 is instructed to be deleted). As previously stated with reference to FIG. 4, since the Virtual PlayLists do not share the Clip with each other, even when the Virtual PlayList is deleted, no change is generated in the contents of the Clip at all.

After completion of the three pieces of deleting processing in Steps S54, S56, and S57, in processing in Step S58, the updating portion 206 updates PL_to_Clips_table( ). That is to say, PL_to_Clips_table( ) is updated so as to correspond to the three pieces of deleting processing in Steps S54, S56, and S57.

Next, in processing in Step S59, the recording portion 201 records the INFO.BAV file. In a word, the INFO.BAV file having PL_to_Clips_table( ) which is updated in the processing in Step S58 is recorded in the recording medium 100.

[Examples of Deletion]

Figures 33, 34:
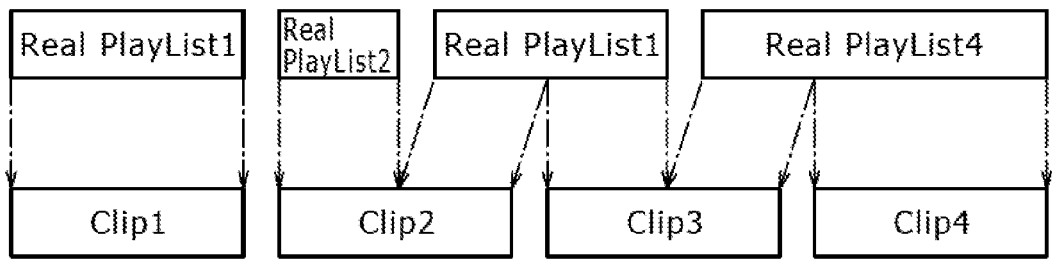
FIG. 33 is a diagram showing an example of a Real PlayList.
FIG. 34 is an image showing an example of a PL_to_Clip_table( ).

Next, an effect of PL_to_Clips_table( ) will be described below. It is supposed that with regard to all of the PlayLists which are recorded under the PLAYLIST directory, as shown in FIG. 33, the PlayList files refer to the Clips. In an example shown in FIG. 33, the Real PlayList 1 refers to the entire Clip 1, and the Real PlayList 2 refers to a part of the Clip 2. A Real PlayList 3 refers to the remaining part of the Clip 2 to which the Real PlayList 2 does not refer, and also refers to a part of a Clip 3. A Real PlayList 4 refers to the remaining part of the Clip 3 to which the Real PlayList 3 does not refer, and also refers to the entire Clip 4.

Now, it is supposed that the Real PlayList 2 is deleted. The Real PlayList 2 refers to the part of the Clip 2. If there is no PL_to_Clips_table( ) it is necessary to read out other Real PlayLists: the Real PlayList 1; the Real PlayList 3; and the Real PlayList 4 from the recording medium 100 and to check whether or not the Clip 2 is referred by other PlayList file(s).

Since in the example shown in FIG. 33, the number of PlayList files under the PLAYLIST directory is four, a time for read out the three files at most is not long. However, when the number of PlayList files recorded in the recording medium 100 is very large (for example, 10,000 or more), it takes a long time to read out all of the PlayList files and to check whether or not the Clip 2 is referred by other PlayList file(s). Then, by reading out PL_to_Clips_table( ) within INFO.BAV, a time necessary for checking a reference relationship between the PlayList files and the Clips can be shortened as compared with the case where PL_to_Clips_table( ) is absent.

FIG. 34 shows an image of PL_to_Clips_table( ) of the INFO.BAV in the case where as shown in FIG. 33, the Real PlayList file is recorded in the recording medium 100. The image shown in FIG. 34 describes that the number of PlayLists (number_of_PlayLists) is four. In addition, it is also described that the Real PlayList 1, the Real PlayList 2, the Real PlayList 3, and the Real PlayList 4 refer to the Clip 1, the Clip 2, the Clip 3, and the Clip 4, respectively.

When the Real PlayList 2 is desired to be deleted, by referring to PL_to_Clips_table( ), it is immediately understood that the Clip 2 is referred by the Real PlayList 3 as well. Therefore, it is understood that although the Real PlayList 2 may be deleted, the Clip 2 should not be deleted.

In such a manner, in a phase of the deletion of a certain Real PlayList, by referring to PL_to_Clips_table( ), it becomes possible to speedily determine whether or not the Clip Information file(s) to which the Real PlayList concerned refers is(are) referred by other PlayList(s). It is possible to delete both of the Real PlayList concerned, and the Clip (the Clip AV stream file corresponding to the Clip Information file) to which only the Real PlayList concerned refers.

[Application of the Present Disclosure to Program]

The series of processing described above either can be executed by hardware, or can be executed by software.

When the series of processing are executed by the software, a program composing the software is installed from either a network or a recording medium either in a computer incorporated in dedicated hardware or in a general-purpose personal computer or the like which can carry out various kinds of functions by installing therein various kinds of program.

A recording medium containing therein such a program is not only composed of a removable media in which a program is recorded, such as a magnetic disk (including a floppy disk), an optical disk (including a Compact Disk-Read Only Memory (CD-ROM) and a DVD), a magneto optical disk (Mini-Disk (MD)) or a semiconductor memory, which is distributed for providing a program for a user separately from a device main body, but also composed of a flash ROM, a hard disk or the like in which a program is recorded, which is provided to a user in a state that they are incorporated in a device main body in advance.

In accordance with a program according to a second embodiment of the present disclosure, a computer is caused to execute: receiving the table describing the correspondence relationship between the reproduction information in accordance with which the reality information as the reality of the contents is specified and which is adapted to share the same reality information with any other suitable reproduction information, and the reality information to which the reproduction information refers in one file with respect to all of the pieces of reproduction information recorded in the recording medium 100; deleting the reproduction information instructed; and updating the table when the reproduction information is deleted.

It is noted that in this specification, the steps of describing the program which is recorded in the recording medium includes processing which is either parallel with or individually executed although it is not unnecessarily processed in a time series manner as well as processing which is executed in a time series manner along the order of the steps.

In addition, the embodiments of the present disclosure are by no means limited to the embodiments described above, and thus various kinds of changes thereof can be made without departing from the subject matter of the present disclosure.

[Others]

The present disclosure can also adopt the following constitutions.

(1) An information processor including:

a recording portion configured to record a table describing a correspondence relationship between reproduction information in accordance with which reality information as reality of contents is specified to be reproduced and which is adapted to share the same reality information with any other suitable reproduction information, and the reality information to which the reproduction information refers, with respect to all of pieces of reproduction information recorded in a recording medium, in one file;

a deleting portion configured to delete the reproduction information instructed; and an updating portion updating the table when the reproduction information is deleted.

(2) The information processor described in the paragraph (1), in which the reproduction information is a PlayList, and the reality information is a Clip.

(3) The information processor described in the paragraph (2), in which the recoding portion further records a file name of the PlayList, a PlayItem representing a reproduction section and contained in the PlayList, and Clip_Information_file_name as a file name of a Clip Information file to which the PlayItem refers.

(4) The information processor described in the paragraph (2) or (3), in which when the PlayList which is instructed to be deleted is a Real PlayList, and any other suitable Real PlayLists refer the same Clip Information file, the deleting portion deletes the Real PlayList which is instructed to be deleted, and when other suitable Real PlayLists does not refer to the same Clip Information file, the deleting portion deletes the Clip Information file corresponding to the Real PlayList in addition to the Real PlayList which is instructed to be deleted.

(5) The information processor described in the paragraph (2), (3) or (4), in which when the PlayList which is instructed to be deleted is a Virtual PlayList, the deleting portion deletes the Virtual PlayList.

(6) An information processing method including:

recording a table describing a correspondence relationship between reproduction information in accordance with which reality information as reality of contents is specified to be reproduced and which is adapted to share the same reality information with any other suitable reproduction information, and the reality information to which the reproduction information refers, with respect to all of pieces of reproduction information recorded in a recording medium, in one file;

deleting the reproduction information instructed; and updating the table when the reproduction information is deleted.

(7) A program in accordance with which a computer is caused to execute:

recording a table describing a correspondence relationship between reproduction information in accordance with which reality information as reality of contents is specified to be reproduced and which is adapted to share the same reality information with any other suitable reproduction information, and the reality information to which the reproduction information refers, with respect to all of pieces of reproduction information recorded in a recording medium, in one file;

deleting the reproduction information instructed; and updating the table when the reproduction information is deleted.

What is claimed is:

1. An information processor, comprising:

a recording portion configured to record a table describing in a list a correspondence relationship between reproduction information, the reproduction information being at least one PlayList, in accordance with which reality information, the reality information being at least one Clip, as reality of contents is specified to be reproduced and which is adapted to share the same reality information with any other suitable reproduction information, and the reality information to which the reproduction information refers, with respect to all of pieces of reproduction information recorded in a recording medium, in one file, in which, when the correspondence relationship indicates a plurality of individual PlayLists, the individual PlayLists being all Playlists recorded in the recording medium, referring to a plurality of different Clips, the different Clips to which the individual PlayLists refer are listed in the table with respect to the individual Playlists;

a deleting portion configured to delete, by referring to the table, the Playlist which is the reproduction information instructed to be deleted, based on a determination whether a Clip referred to by the PlayList which is instructed to be deleted is referred to by other Playlist when the PlayList which is instructed to be deleted is determined to be a Real PlayList; and an updating portion configured to update said table when the reproduction information is deleted.

2. The information processor according to claim 1, wherein said recording portion further records:

for each of the individual PlayLists, a file name of the PlayList and a PlayItem representing a reproduction section and contained in the PlayList; and Clip_Information_file_name as a file name of a Clip Information file to which the PlayItem refers.

3. The information processor according to claim 2, wherein when the PlayList which is instructed to be deleted is a Real PlayList, and other suitable Real PlayLists refer to the same Clip Information file, the deleting portion deletes the Real PlayList which is instructed to be deleted without deleting the same Clip Information file, and when other suitable Real PlayLists do not refer to the same Clip Information file, the deleting portion deletes the Clip Information file corresponding to the Real PlayList in addition to the Real PlayList which is instructed to be deleted.

4. The information processor according to claim 3, wherein when the PlayList which is instructed to be deleted is a Virtual PlayList, the deleting portion deletes the Virtual PlayList.

5. An information processing method, comprising:

recording a table describing in a list a correspondence relationship between reproduction information, the reproduction information being at least one PlayList, in accordance with which reality information, the reality information being at least one Clip, as reality of contents is specified to be reproduced and which is adapted to share the same reality information with any other suitable reproduction information, and the reality information to which the reproduction information refers, with respect to all of pieces of reproduction information recorded in a recording medium, in one file, in which, when the correspondence relationship indicates a plurality of individual PlayLists, the individual PlayLists being all Playlists recorded in the recording medium, referring to a plurality of different Clips, the different Clips to which the individual PlayLists refer are listed in the table with respect to the individual Playlists;

deleting, by referring to the table, the Playlist which is the reproduction information instructed to be deleted, based on a determination whether a Clip referred to by the PlayList which is instructed to be deleted is referred to by other Playlist when the PlayList which is instructed to be deleted is determined to be a Real PlayList; and updating said table when the reproduction information is deleted.

6. A non-transitory recording medium on which is recorded a program in accordance with which a computer is caused to execute:

recording a table describing in a list a correspondence relationship between reproduction information, the reproduction information being at least one PlayList, in accordance with which reality information, the reality information being at least one Clip, as reality of contents is specified to be reproduced and which is adapted to share the same reality information with any other suitable reproduction information, and the reality information to which the reproduction information refers, with respect to all of pieces of reproduction information recorded in a recording medium, in one file, in which, when the correspondence relationship indicates a plurality of individual PlayLists, the individual PlayLists being all Playlists recorded in the recording medium, referring to a plurality of different Clips, the different Clips to which the individual PlayLists refer are listed in the table with respect to the individual Playlists;

deleting, by referring to the table, the Playlist which is the reproduction information instructed to be deleted, based on a determination whether a Clip referred to by the PlayList which is instructed to be deleted is referred to by other Playlist when the PlayList which is instructed to be deleted is determined to be a Real PlayList; and updating said table when the reproduction information is deleted.

* * * * *